United States Patent
Jeong et al.

(10) Patent No.: US 9,176,344 B2
(45) Date of Patent: Nov. 3, 2015

(54) LIQUID CRYSTAL DISPLAY HAVING PIXEL ELECTRODE WITH CONCAVE DOWNWARD OR CONVEX UPWARD PORTIONS

(75) Inventors: Youn-Hak Jeong, Cheonan-si (KR);
Hee-Hwan Lee, Busan (KR);
Keun-Chan Oh, Cheonan-si (KR);
Jae-Jin Lyu, Yongin-si (KR);
Yoon-Sung Um, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1264 days.

(21) Appl. No.: 12/903,601

(22) Filed: Oct. 13, 2010

(65) Prior Publication Data

US 2011/0260957 A1    Oct. 27, 2011

(30) Foreign Application Priority Data

Apr. 21, 2010    (KR) .................. 10-2010-0037084

(51) Int. Cl.
*G02F 1/1337*    (2006.01)

(52) U.S. Cl.
CPC .... *G02F 1/133707* (2013.01); *G02F 1/133753* (2013.01); *G02F 2001/133776* (2013.01)

(58) Field of Classification Search
CPC .......... G02F 1/133707; G02F 1/33753; G02F 2001/133776
See application file for complete search history.

(56) References Cited

U.S. PATENT DOCUMENTS

| | | | |
|---|---|---|---|
| 6,441,877 B1 * | 8/2002 | Watanabe | 349/138 |
| 7,019,806 B2 * | 3/2006 | Um et al. | 349/129 |
| 7,113,241 B2 * | 9/2006 | Hanaoka | 349/139 |
| 7,177,000 B2 * | 2/2007 | Hu et al. | 349/122 |
| 7,929,096 B2 * | 4/2011 | Yeom et al. | 349/139 |
| 2006/0066791 A1 * | 3/2006 | Mizusako et al. | 349/123 |
| 2009/0207359 A1 | 8/2009 | Shin et al. | |

FOREIGN PATENT DOCUMENTS

| | | |
|---|---|---|
| JP | 2000-111951 | 4/2000 |
| JP | 2001-083517 | 3/2001 |
| JP | 2001-174821 | 6/2001 |
| JP | 2002-055347 | 2/2002 |
| JP | 2002-229029 | 8/2002 |
| JP | 2003-149647 | 5/2003 |
| JP | 2003-186038 | 7/2003 |
| JP | 2005-070146 | 3/2005 |
| JP | 2005-316330 | 11/2005 |

(Continued)

*Primary Examiner* — Paisley L Arendt

(74) *Attorney, Agent, or Firm* — H.C. Park & Associates, PLC

(57) ABSTRACT

A liquid crystal display includes a first substrate and a second substrate facing each other; a switching element disposed on the first substrate; a pixel electrode connected to the switching element and supplied with a data voltage; an opposing electrode disposed on the second substrate; and a liquid crystal layer disposed between the first substrate and the second substrate and including liquid crystal molecules. The pixel electrode includes a cutout and a liquid crystal direction controller that are alternately disposed. The cutout and the liquid crystal direction controller divide the pixel electrode into a plurality of sub-regions, and inclination directions of the liquid crystal molecules are different according to the plurality of sub-regions when the pixel electrode is supplied with the data voltage. The liquid crystal direction controller is concave downward or convex upward with respect to a surface of the first substrate.

15 Claims, 17 Drawing Sheets

(56) References Cited

FOREIGN PATENT DOCUMENTS

| | | |
|---|---|---|
| JP | 2005-331954 | 12/2005 |
| JP | 2006-126811 | 5/2006 |
| JP | 2006-243494 | 9/2006 |
| JP | 2008-003372 | 1/2008 |
| KR | 10-0345959 | 7/2002 |
| KR | 1020080049383 | 6/2008 |
| KR | 1020080049514 | 6/2008 |
| KR | 1020090059957 | 6/2009 |

\* cited by examiner (a)

(b)

(c)

LIQUID CRYSTAL DISPLAY HAVING PIXEL ELECTRODE WITH CONCAVE DOWNWARD OR CONVEX UPWARD PORTIONS

CROSS REFERENCE TO RELATED APPLICATION

This application claims priority from and the benefit of Korean Patent Application No. 10-2010-0037084, filed on Apr. 21, 2010, which is hereby incorporated by reference for all purposes as if fully set forth herein.

BACKGROUND OF THE INVENTION

1. Field of the Invention

Exemplary embodiments of the present invention relate to a liquid crystal display.

2. Discussion of the Background

Liquid crystal displays are widely used as a type of flat panel display. A liquid crystal display has two display panels on which field generating electrodes such as pixel electrodes and a common electrode are formed, and a liquid crystal layer is interposed between the display panels. In the liquid crystal display, voltages are applied to the field generating electrodes to generate an electric field through the liquid crystal layer. The alignment of liquid crystal molecules in the liquid crystal layer is determined by the electric field strength experienced by the liquid crystal molecules. As light passes through the liquid crystal layer, the polarization of the incident light is controlled via interactions with the liquid crystal molecules, thereby creating an image display.

Among the LCDs, a vertical alignment (VA) mode LCD, which aligns LC molecules with their long axes perpendicular to the panels in the absence of an electric field, is highlighted because of its high contrast ratio and wide reference viewing angle.

In the vertical alignment (VA) mode LCD, the wide reference viewing angle may be realized by forming a plurality of domains including liquid crystal of different alignment directions in one pixel.

As one example of forming the plurality of domains in one pixel, a method of forming cutouts establishes minute slits in the field generating electrodes. In this method, the plurality of domains may be formed by aligning the liquid crystal molecules vertically with respect to a fringe field generated between the edges of the cutout and the field generating electrodes facing the edges.

The information in this section is for understanding of the background of the invention, and, therefore, it may contain information that is not part of the prior art.

SUMMARY OF THE INVENTION

Exemplary embodiments of the present invention provide a liquid crystal display with enhanced display qualities.

Exemplary embodiments of the present invention also provide a liquid crystal display with increased response speed of the liquid crystal display.

Exemplary embodiments of the present invention further provide a liquid crystal display having a viewing angle that is increased by varying the inclined directions of the liquid crystal molecules within the liquid crystal layer.

Additional features of the invention will be set forth in the description that follows and, in part, will be apparent from the description or may be learned by practice of the invention.

An exemplary embodiment of the present invention discloses a liquid crystal display that includes a first substrate and a second substrate facing each other; a switching element disposed on the first substrate; a pixel electrode connected to the switching element and supplied with a data voltage; an opposing electrode disposed on the second substrate; and a liquid crystal layer disposed between the first substrate and the second substrate and including liquid crystal molecules. The pixel electrode includes a plurality of minute branches and a plurality of sub-regions having different length directions of the minute branches, and the minute branches are concave downward or convex upward with respect to a surface of the first substrate. At least one of a width of the minute branches and a width of a region between the minute branches ranges from 2 µm to 6 µm.

An exemplary embodiment of the present invention also discloses a liquid crystal display that includes a first substrate and a second substrate facing each other; a switching element disposed on the first substrate; a pixel electrode connected to the switching element and supplied with a data voltage; an opposing electrode disposed on the second substrate; and a liquid crystal layer disposed between the first substrate and the second substrate and including liquid crystal molecules. The pixel electrode includes a plurality of minute branches and a plurality of sub-regions having different length directions of the minute branches, and the minute branches are concave downward or convex upward with respect to a surface of the first substrate. A region between the minute branches neighboring one side of one of the minute branches is removed thereby forming a slit, or a minute branch neighboring one side of one region between the minute branches is removed thereby forming a slit.

An exemplary embodiment of the present invention further discloses a liquid crystal display that includes a first substrate and a second substrate facing each other; a switching element disposed on the first substrate; a pixel electrode connected to the switching element and supplied with a data voltage; an opposing electrode disposed on the second substrate; and a liquid crystal layer disposed between the first substrate and the second substrate and including liquid crystal molecules. The pixel electrode includes a plurality of minute branches and a plurality of sub-regions having different length directions of the minute branches, and the minute branches are concave downward or convex upward with respect to a surface of the first substrate. The concave downward shape or convex upward shape of neighboring minute branches among the plurality of minute branches are opposite to each other.

An exemplary embodiment of the present invention additionally discloses a liquid crystal display that includes a first substrate and a second substrate facing each other; a switching element disposed on the first substrate; a pixel electrode connected to the switching element and supplied with a data voltage; an opposing electrode disposed on the second substrate; and a liquid crystal layer disposed between the first substrate and the second substrate and including liquid crystal molecules. The pixel electrode includes a cutout and a liquid crystal direction controller that are alternately disposed, and the cutout and the liquid crystal direction controller divide the pixel electrode into a plurality of sub-regions. Inclination directions of the liquid crystal molecules are different according to the plurality of sub-regions when the pixel electrode is supplied with the data voltage, and the liquid crystal direction controller is concave downward or convex upward with respect to a surface of the first substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
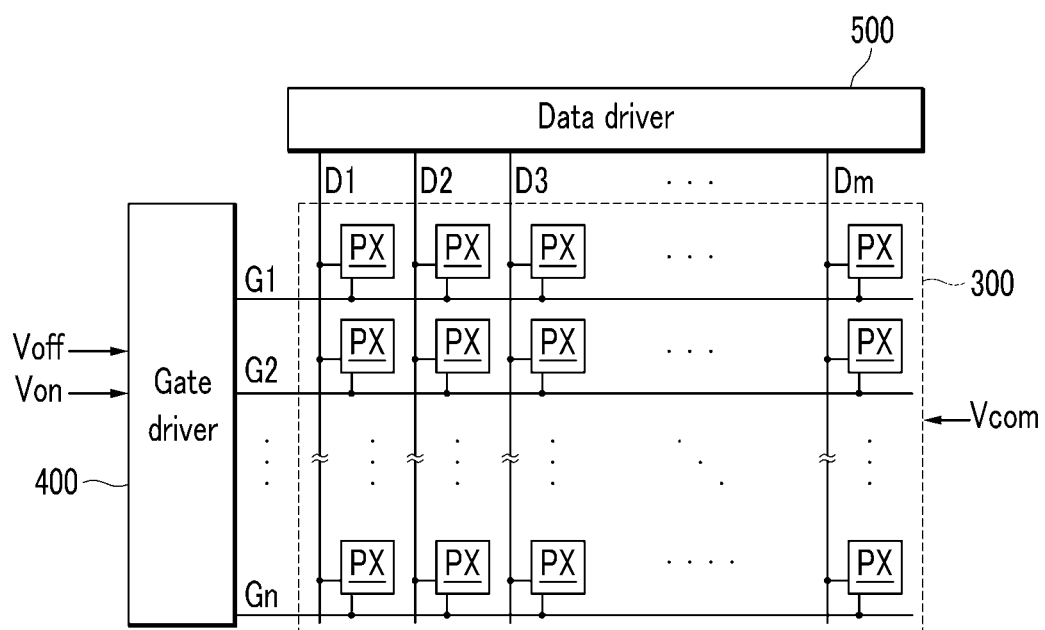
FIG. 1 is a block diagram of a liquid crystal display according to an exemplary embodiment of the present invention.

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to," or "coupled to" another element or layer, it can be directly on, directly connected to, directly coupled to the other element or layer, or intervening elements or layers may be present. In contrast, when an element is referred to as being "directly on," "directly connected to," or "directly coupled to" another element or layer, there are no intervening elements or layers present.

Now, a liquid crystal display according to an exemplary embodiment of the present invention will be described with reference to FIG. 1 and FIG. 2.

Figure 2:
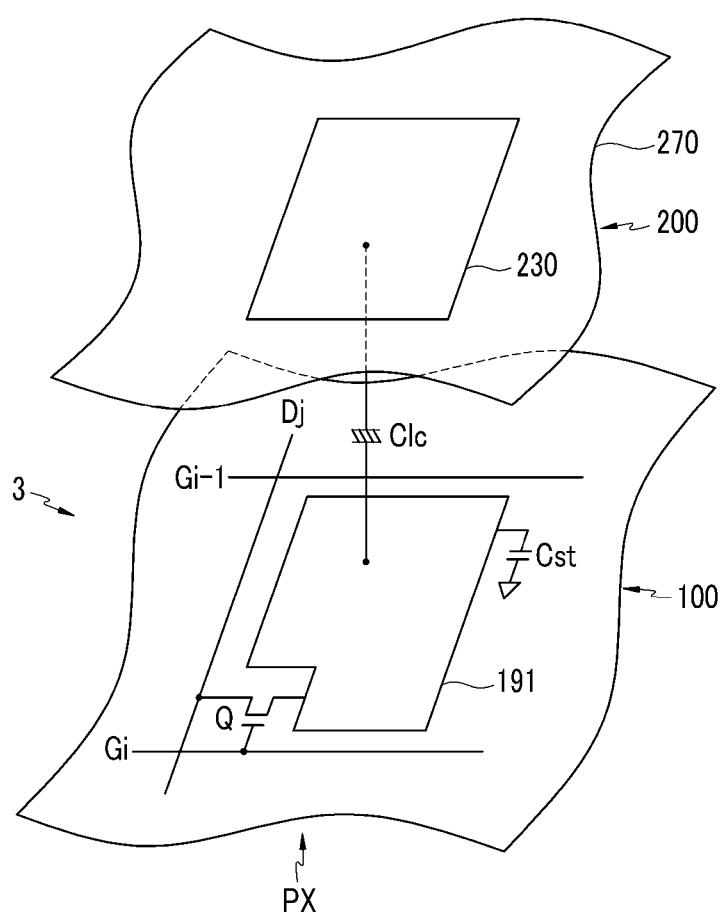
FIG. 2 is an equivalent circuit diagram of one pixel of a liquid crystal display according to an exemplary embodiment of the present invention

FIG. 1 is a block diagram of a liquid crystal display according to an exemplary embodiment of the present invention, and FIG. 2 is an equivalent circuit diagram of one pixel of a liquid crystal display according to an exemplary embodiment of the present invention.

As shown in FIG. 1, a liquid crystal display according to an exemplary embodiment of the present invention includes a liquid crystal panel assembly 300, a gate driver 400, and a data driver 500.

In an equivalent circuit, the liquid crystal panel assembly 300 includes a plurality of signal lines G1-Gn and D1-Dm, and a plurality of pixels PX that are connected to the signal lines and arranged in an approximate matrix format. Referring to the structure shown in FIG. 2, the liquid crystal panel assembly 300 includes lower and upper display panels 100 and 200 that face each other and a liquid crystal layer 3 interposed therebetween.

The signal lines G1-Gn and D1-Dm are provided on the lower panel 100 and include a plurality of gate lines G1-Gn that transmit gate signals (also referred to as "scanning signals") and a plurality of data lines D1-Dm that transmit data signals.

Each pixel PX, for example a pixel PX that is connected to an i-th (i=1, 2, . . . , n) gate line Gi and a j-th (j=1, 2, . . . , m) data line Dj, includes a switching element Q that is connected to the signal lines Gi and Dj and a liquid crystal capacitor Clc and a storage capacitor Cst that are connected thereto. The storage capacitor Cst may be omitted if necessary.

The switching element Q is a three-terminal element such as a thin film transistor (TFT) and is provided to the lower panel 100, and a control terminal of the TFT is connected to the gate line Gi. An input terminal of the TFT is connected to the data line Dj, and an output terminal of the TFT is connected to the liquid crystal capacitor Clc and the storage capacitor Cst.

The liquid crystal capacitor Clc has two terminals of a pixel electrode 191 of the lower panel 100 and an opposing electrode 270 formed with a single integral plate throughout the plurality of pixels PX on the upper panel 200. The liquid crystal layer 3 serves as a dielectric material between the pixel electrode 191 and the opposing electrode 270.

The storage capacitor Cst functioning as an auxiliary capacitor for the liquid crystal capacitor Clc includes the pixel electrode 191 and a separate signal line (not shown), which is provided on the lower panel 100 and overlaps the pixel electrode 191 via an insulator. The separate signal line is applied with a voltage such as a common voltage Vcom. Alternatively, the storage capacitor Cst may include the pixel electrode 191 and a previous gate line Gi-1, which overlaps the pixel electrode 191 via an insulator in the lower panel 100.

For color display, each pixel PX uniquely represents one of three primary colors (i.e., spatial division), or each pixel PX sequentially represents the three primary colors in turn (i.e., temporal division). In this fashion, a spatial or temporal sum of the primary colors is recognized as a desired color. An example of a set of the three primary colors includes red, green, and blue colors.

FIG. 2 shows an example of the spatial division in which each pixel PX includes a color filter 230 representing one of the primary colors in an area of the upper panel 200 facing the pixel electrode 191. Alternatively, although not shown in FIG. 2, the color filter 230 may be provided on or under the pixel electrode 191 on the lower panel 100.

At least one polarizer (not shown) may be attached on the outer side of the liquid crystal panel assembly 300.

Referring again to FIG. 1, the data driver 500 is connected to the data lines D1-Dm of the liquid crystal panel assembly 300 to apply the data voltage to the data lines D1-Dm.

The gate driver 400 is connected to the gate lines G1-Gn of the liquid crystal panel assembly 300 to apply gate signals to the gate lines G1-Gn obtained by combining a gate-on voltage Von turning on the switching element Q and a gate-off voltage Voff turning off the switching element Q.

Next, an exemplary embodiment of the liquid crystal display shown in FIG. 1 and FIG. 2 will be described with the reference to FIG. 3, FIG. 4, and FIG. 5.

Figure 3:
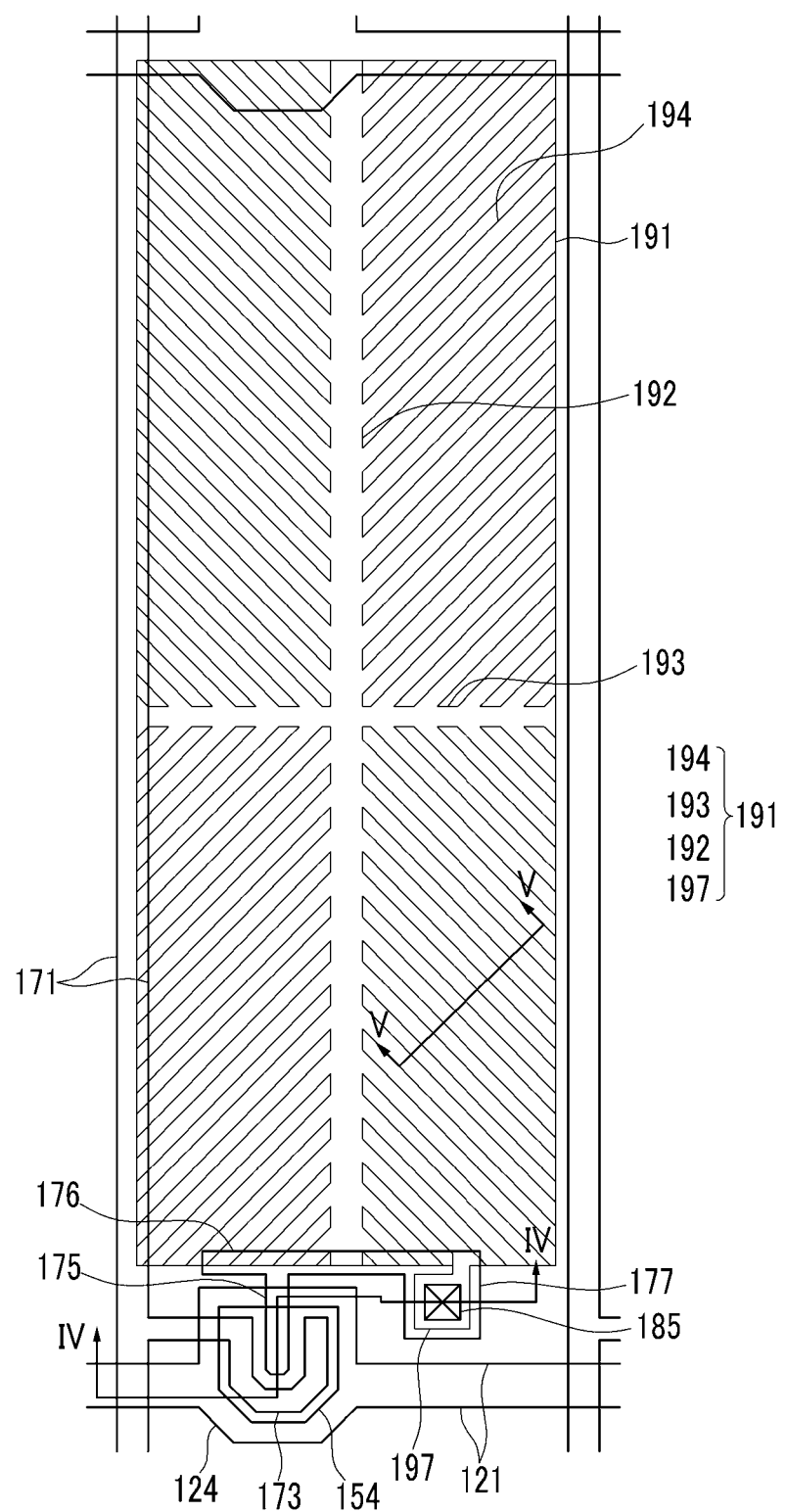
FIG. 3 is a layout view of one pixel of a liquid crystal display according to an exemplary embodiment of the present invention.
Figure 4:
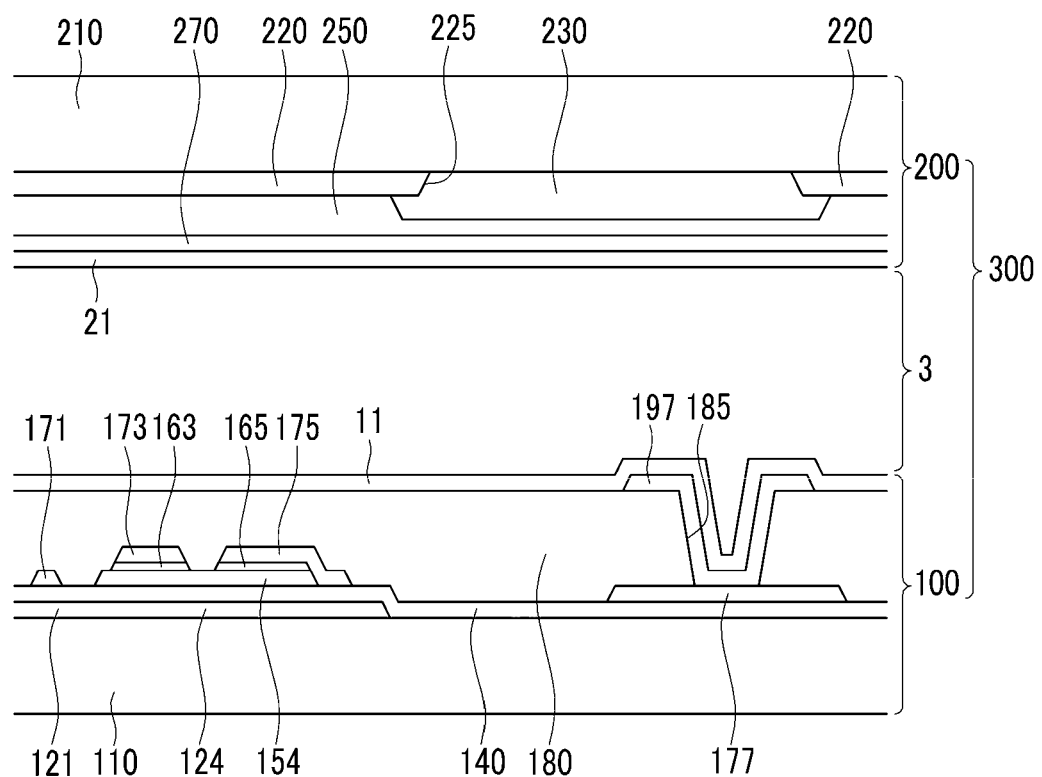
FIG. 4 is a cross-sectional view of the liquid crystal display of FIG. 3 taken along line IV-IV.

FIG. 3 is a layout view of one pixel of a liquid crystal display according to an exemplary embodiment of the present invention, and FIG. 4 is a cross-sectional view of the liquid crystal display of FIG. 3 taken along line IV-IV. FIG. 5 is an exemplary cross-sectional view of the liquid crystal display of FIG. 3 taken along line V-V.

A liquid crystal panel assembly 300 according to an exemplary embodiment of the present invention includes the lower panel 100 and the upper panel 200 facing each other and the liquid crystal layer 3 interposed therebetween.

Now, the lower panel 100 is described.

A plurality of gate lines 121 respectively including gate electrodes 124 are formed on an insulating substrate 110. The gate lines 121 transmit gate signals and extend in a transverse direction.

A gate insulating layer 140 is formed on the gate lines 121, and a plurality of semiconductor islands 154 preferably made of hydrogenated amorphous silicon or polysilicon are formed on the gate insulating layer 140.

A plurality of pairs of ohmic contact islands 163 and 165 are formed on the semiconductor islands 154. The ohmic contact islands 163 and 165 are preferably made of n+ hydrogenated a-Si heavily doped with an n-type impurity such as phosphorous, or they may be made of a silicide.

A plurality of data lines 171 and a plurality of drain electrodes 175 are formed on the ohmic contacts 163 and 165 and the gate insulating layer 140.

The data lines 171 transmit data voltages and substantially extend in the longitudinal direction, thereby intersecting the gate lines 121. The data lines 171 include a plurality of source electrodes 173 extending toward the gate electrodes 124 and having a U-shape.

The drain electrodes 175 include a longitudinal portion (reference numeral denotes 175), a transverse portion 176, and an expansion portion 177. The longitudinal portion 175 is opposite to the source electrode 173 with respect to the gate electrode 124, and the transverse portion 176 perpendicularly intersects the longitudinal portion 175 and is parallel to the gate lines 121. The expansion portion 177 is disposed on one end of the transverse portion 176 and has an area for connection with another layer.

The gate electrode 124, the source electrode 173, and the drain electrode 175 form a thin film transistor (TFT) Q along with the semiconductor island 154, and a channel of the thin film transistor Q are formed in the semiconductor island 154 between the source electrode 173 and the drain electrode 175.

The ohmic contacts 163 and 165 are interposed only between the underlying semiconductor islands 154 and the overlying source electrode 173, the data lines 171, and the drain electrodes 175 to reduce contact resistance therebetween. The semiconductor islands 154 include exposed portions that are not covered by the source electrode 173 and the drain electrode 175 and portions disposed between the data lines 171 and the drain electrodes 175.

A passivation layer 180, which may be made of an organic insulating material or an inorganic insulating material, is formed on the data lines 171, the drain electrodes 175, the source electrodes 173, and the exposed semiconductor islands 154. The passivation layer 180 includes a plurality of contact holes 185 exposing the expansion portions 177 of the drain electrodes 175. Also, referring to FIG. 5, the upper surface of the passivation layer 180 includes a portion in which a plurality of protrusions and depressions are formed, and the description of the shape of the protrusions and depressions is given below with the description of the pixel electrode 191.

A plurality of pixel electrodes 191, which may be made of a transparent conductive material such as indium tin oxide (ITO) or indium zinc oxide (IZO) or a reflective metal such as aluminum, silver, chromium, or an alloy thereof, are formed on the passivation layer 180.

The overall shape of the pixel electrodes 191 is a quadrangle, and each pixel electrode 191 includes a transverse stem 193, a longitudinal stem 192 intersecting the transverse stem 193, a plurality of minute branches 194, and a lower protrusion portion 197. Also, the pixel electrode 191 is divided into four sub-regions by the transverse stem 193 and the longitudinal stem 192. The minute branches 194 obliquely extend from the transverse stem 193 and the longitudinal stem 192, and the extending direction thereof forms an angle of about 45° or 135° with the gate lines 121 or the transverse stem 193. Also, the minute branches 194 of two neighboring sub-regions may form a substantially right angle.

Figure 5:
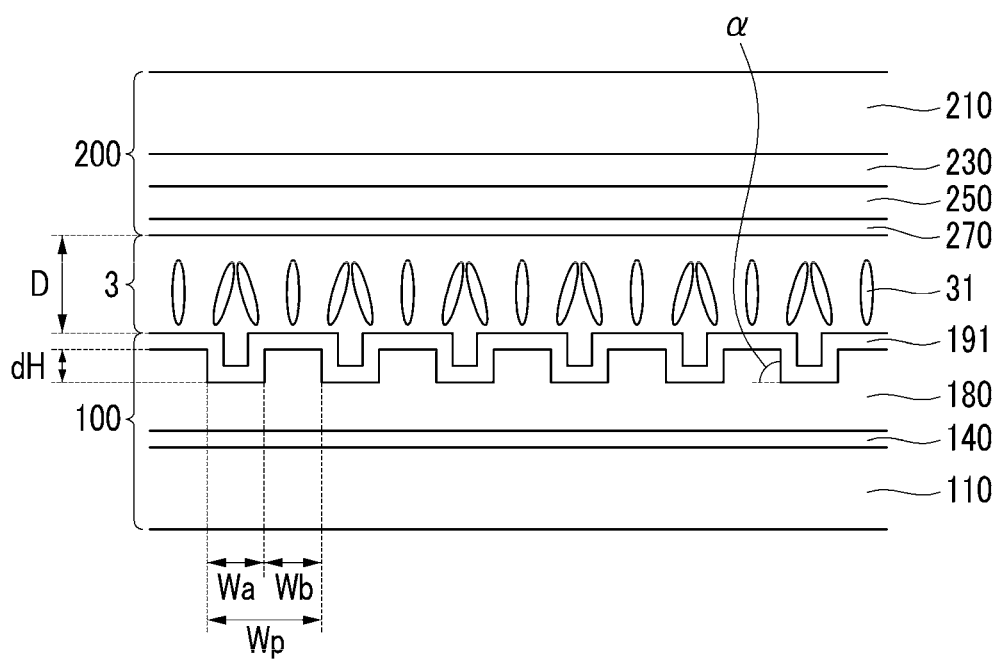
FIG. 5 is an exemplary cross-sectional view of the liquid crystal display of FIG. 3 taken along line V-V, FIG. 6 are cross-sectional views of the liquid crystal display of FIG. 3 taken along line V-V showing an arrangement change of liquid crystal molecules with application of an electric field to the liquid crystal layer.

According to the exemplary embodiment shown in FIG. 3 and FIG. 5, the minute branches 194 of the pixel electrode 191 are physically connected to each other. That is, the pixel electrode 191 has a plurality of protrusions and depressions formed along the protrusions and depressions of the passivation layer 180. Referring to FIG. 5, the minute branches 194 correspond to the convex portion, and the regions between the minute branches 194 correspond to the concave portion. As used here, the term concave corresponds to a direction extending into the plane of FIG. 3 and a down direction with respect to FIG. 5. The term convex corresponds to a direction extending out of the plane of FIG. 3 and an up direction with respect to FIG. 5. Accordingly, the transverse stem 193 and the longitudinal stem 192 of the pixel electrode 191 may be formed in a convex shape. However, along with the minute branches 194 shown in FIG. 3, the transverse stem 193 and the longitudinal stem 192 may be formed to be concave, while the regions between the minute branches 194 may be formed to be convex.

The angle α of the side surface of the convex portion forming the minute branches 194 of the pixel electrode 191 with respect to the surface of the substrate 110 is shown to be an approximate right angle in FIG. 5, but it is not limited thereto and may be from 10° to 100°.

The width Wb of the minute branches 194 (or the convex portion) and the width Wa of the regions between the minute branches 194 (or the concave portion) may be from 2 μm to 6 μm. Accordingly, one protrusion and depression, that is, the total width Wp of the neighboring concave portion and the convex portion, may be from 4 μm to 12 μm. Also, a height difference dH between the concave portion and the convex portion of the pixel electrode 191 may be less than about 20% of the cell gap D of the liquid crystal layer 3 or from 0.1 μm to 0.6 μm. Here, the cell gap D of the liquid crystal layer 3 may be from 1 μm to 10 μm.

The lower protrusion 197 of the pixel electrode 191 is connected to the drain electrode 175 through the contact hole 185, thereby receiving the data voltage from the drain electrode 175. An alignment layer 11 is formed on the pixel electrode 191.

Now, the upper panel 200 is described.

A light blocking member 220 is formed on a substrate 210. The light blocking member 220 prevents light leakage generated between the pixel electrodes 191 and includes a plurality of openings 225 defining the regions facing the pixel electrodes 191.

A plurality of color filters 230 are formed on the substrate 210 and the light blocking member 220. Most of the color filters 230 are disposed in the regions enclosed by the light blocking members 220 and may extend along the column of the pixel electrodes 191, i.e., in the longitudinal direction in FIG. 3. Each color filter 230 may display one color among three primary colors such as the primary colors red, green, and blue.

An overcoat 250 is formed on the color filters 230 and the light blocking member 220, and an opposing electrode 270, which may be made of a transparent conductor such as ITO or IZO, is formed on the whole surface of the overcoat 250. The opposing electrode 270 may be formed with one plate to correspond to the plurality of pixel electrodes 191, for example all pixel electrodes 191. The surface of the opposing electrode 270 may be substantially flat.

An alignment layer 21 is formed on the opposing electrode 270. The two alignment layers 11 and 21 may be vertical alignment layers.

The liquid crystal layer 3 between the lower panel 100 and the upper panel 200 may include liquid crystal molecules 31 that may have negative dielectric anisotropy. The liquid crystal molecules 31 may be oriented such that the major axes thereof are almost perpendicular to the surfaces of the two display panels 100 and 200 when no electric field is applied. However, the liquid crystal molecules 31 positioned near the edge of the convex portion of the pixel electrode 191, for example, the minute branches 194 of the pixel electrode 191 in the exemplary embodiment of FIG. 5, may be inclined toward the concave portion according to the inclination of the edge of the convex portion.

Also, the liquid crystal molecules 31 may be initially aligned with a pretilt in the direction substantially parallel to the length direction of the minute branches 194. In this case, the liquid crystal layer 3 may further include a polymer determining the pretilt of the liquid crystal molecule 31 in addition to the liquid crystal molecules 31. A method in which the liquid crystal molecules 31 are initially aligned to have the pretilt is described below.

Next, an operation of the liquid crystal display according to an exemplary embodiment of the present invention is described with reference to FIG. 3, FIG. 4, FIG. 5, and FIG. 6.

Figure 6:
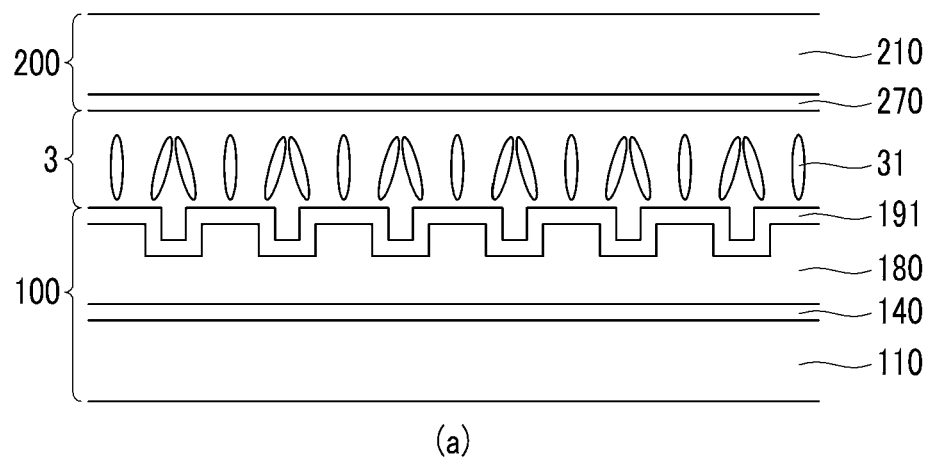
Figure 6:
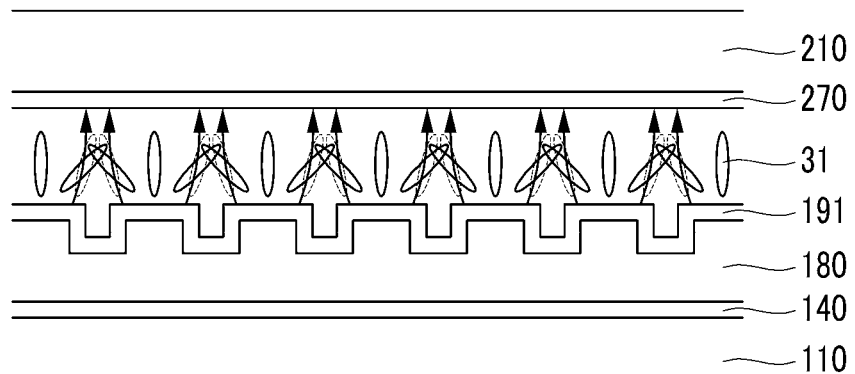
Figure 6:
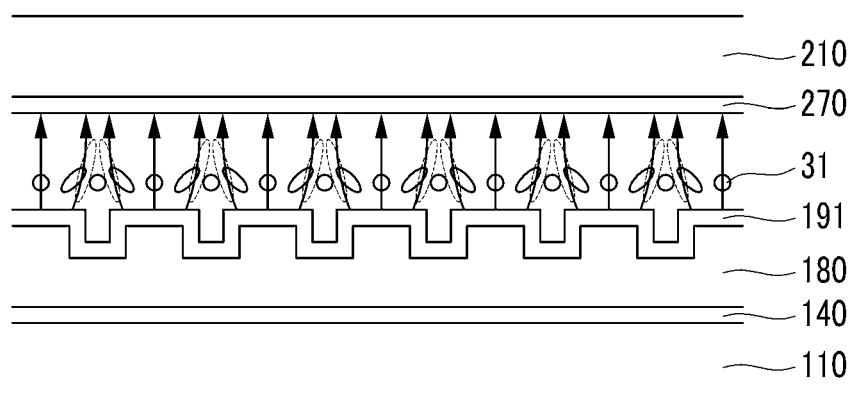

FIG. 6 are cross-sectional views of the liquid crystal display of FIG. 3 taken along line V-V showing an arrangement change of liquid crystal molecules with application of an electric field to the liquid crystal layer.

If the gate signal is applied to the gate line 121, the switching element Q, i.e., the TFT, connected to the gate line 121 is turned on. Accordingly, the data voltages applied to the data line 171 are transmitted to the pixel electrode 191 through the TFT Q when turned on. The pixel electrode 191 applied with the data voltage generates an electric field through the liquid crystal layer 3 along with the opposing electrode 270 that is applied with a voltage. Thus, the liquid crystal molecules 31 of the liquid crystal layer 3 change directions so that their major axes become perpendicular to the direction of the electric field in response to the electric field. The change in the degree of the polarization of the light that is incident to the liquid crystal layer 3 is changed according to the inclination degree of the liquid crystal molecules 31, and this change of polarization appears as a change of transmittance by the polarizer, thereby displaying images of the liquid crystal display.

On the other hand, the edge of the convex portion, i.e., the minute branches 194 in the exemplary embodiment of FIG. 5 and FIG. 6, of the protrusions and depressions of the pixel electrode 191 distorts the electric field, thereby producing a fringing field via production of a horizontal component of the electric field that is substantially perpendicular to the edge of the convex portion of the pixel electrode. Consequently, the inclination direction of the liquid crystal molecules 31 is determined by the horizontal component of the electric field. Accordingly, the liquid crystal molecules 31 tend to tilt in the direction substantially perpendicular to the edge of the convex portion of the pixel electrode 191. However, since the directions of the horizontal components of the electric field of the edges of neighboring convex portions are opposite to each other, i.e., the electric field vectors point substantially toward or away from each other, and the interval between the convex portions is narrow, the liquid crystal molecules 31 that tend to tilt in the opposite directions are consequently tilted in the direction substantially parallel to the length direction of the convex portion.

In addition, the liquid crystal molecules 31 are already inclined toward the concave portion according to the inclination of the edge of the convex portion of the protrusions and depressions of the pixel electrode 191 such that they further tend to tilt in the direction substantially perpendicular to the edge of the convex portion. Further, when the liquid crystal molecules 31 are pre-pretilted in the length direction of the convex portion, that is, the minute branches 194, the liquid crystal molecules may not be inclined in the direction of the length direction of the convex portion, that is, the minute branches 194, by two steps, but may be directly inclined in the pre-tilted direction by one step. Accordingly, the response speed of the liquid crystal display can be enhanced.

One pixel electrode 191 includes four sub-regions where the length directions of the minute branches 194 are different such that the inclination directions of the liquid crystal molecules of the liquid crystal layer 3 are in four directions. Four domains having different alignment directions of the liquid crystal molecules 31 are also formed in the liquid crystal layer 3. Therefore, the viewing angle of the liquid crystal display may be increased by varying the inclined directions of the liquid crystal molecules. As described above, the transverse stem 193, the longitudinal stem 192, and the minute branches 194 of the pixel electrode 191 for controlling the inclination direction of the liquid crystal molecules 31 are referred to as a liquid crystal direction controllers.

The pixel electrode 191 and the opposing electrode 270 forming the liquid crystal capacitor Clc maintain the applied voltage after the switching element TFT Q is turned off.

The above operation is repeatedly performed with a horizontal period of 1H. The gate signal is sequentially applied to the gate lines G1-Gn, and the data voltage is applied to the pixel electrodes 191 to display one frame of an image.

After one frame ends, a subsequent frame is started, and a state of an inversion signal applied to the data driver 500 to invert the polarity of the data voltage applied to each pixel PX that differs from the polarity of a previous frame is controlled. This scheme is referred to as "frame inversion."

Although not shown in FIG. 6, the color filter 230, the overcoat 250, and the alignment layers 11 and 21 described in the previous exemplary embodiment may be included.

As described above, according to the present exemplary embodiment, the liquid crystal molecules 31 of the liquid crystal layer 3 are inclined according to the shape of the protrusions and depressions of the liquid crystal direction controllers 192, 193, and 194 of the pixel electrode 191 so that the response speed of the liquid crystal molecules 31 may be improved. Also, the regions between the minute branches 194 of the pixel electrode 191 are not removed but are formed as concave portions so that the electric field component perpendicular to the two display panels 100 and 200 may be varied and increased in the liquid crystal layer 3, and, accordingly, the response speed of the liquid crystal molecules 31 may be improved. Further, the transmittance of the liquid crystal display may be increased.

Also, by setting the width of the liquid crystal direction controllers 192, 193, and 194 of the pixel electrode 191 including the protrusions and depressions or the height difference between the concave portion and the convex portion of the pixel electrode 191 as descried above, the response speed of the liquid crystal molecules 31 of the liquid crystal layer 3 may be further improved, and the transmittance of the liquid crystal display may be improved.

Next, an exemplary embodiment of an initial alignment method for providing a pretilt angle to liquid crystal molecules 31 is described.

First, prepolymers, for example, monomers that may be hardened through photopolymerization such as by ultraviolet light, are arranged between two display panels 100 and 200 along with the liquid crystal material. The prepolymers may be a reactive mesogen that may be polymerized by light such as ultraviolet light.

Next, similar to the above-described operation of the liquid crystal display, the pixel electrode 191 is applied with the data voltages, and the opposing electrode 270 of the upper panel 200 is applied with a voltage to generate an electric field through the liquid crystal layer 3 between the two display panels 100 and 200. Thus, the liquid crystal molecules 31 of the liquid crystal layer 3 are inclined in the direction parallel to the length direction of the minute branches 194 through two steps as above-described in response to the electric field, and the liquid crystal molecules 31 in one pixel PX are inclined in a total of four directions.

If the light, e.g., ultraviolet light, is irradiated after the application of the electric field to the liquid crystal layer 3, the prepolymers may be polymerized to form polymers in the liquid crystal layer 3 or in contact with the surface of the alignment layer 11 and 21 of the display panels 100 and 200. The alignment direction of the liquid crystal molecules 31 may be determined to have the pretilt in the length direction of the minute branches 194 by the polymer formed in the liquid crystal layer 3 or the polymer formed between the liquid crystal molecules 31 and the alignment layers 11 and 21 in the state that the voltage is not applied to the pixel electrode 191 and the opposing electrode 270. It is preferable that the pretilt ranges from 88° to 89.9° with respect to the surface of the substrate. If the pretilt is more than about 85°, the response speed of the display may be greatly improved while minimizing a loss of contrast ratio.

Next, a liquid crystal display according to various exemplary embodiments of the present invention will be described with reference to FIG. 7, FIG. 8, FIG. 9, FIG. 10, FIG. 11, FIG. 12, and FIG. 13 as well as FIG. 1, FIG. 2, FIG. 3, FIG. 4, FIG. 5, and FIG. 6. Like reference numerals designate like elements in the exemplary embodiments, and descriptions given above are not repeated.

FIG. 7, FIG. 8, FIG. 9, FIG. 10, FIG. 11, FIG. 12, and FIG. 13 are exemplary cross-sectional view of the liquid crystal display of FIG. 3 taken along line V-V. Although not shown in FIG. 7, FIG. 8, FIG. 9, FIG. 10, FIG. 11, FIG. 12, and FIG. 13, the above-described color filter 230, overcoat 250, or alignment layers 11 and 21 of the previous exemplary embodiment may be included.

Figure 7:
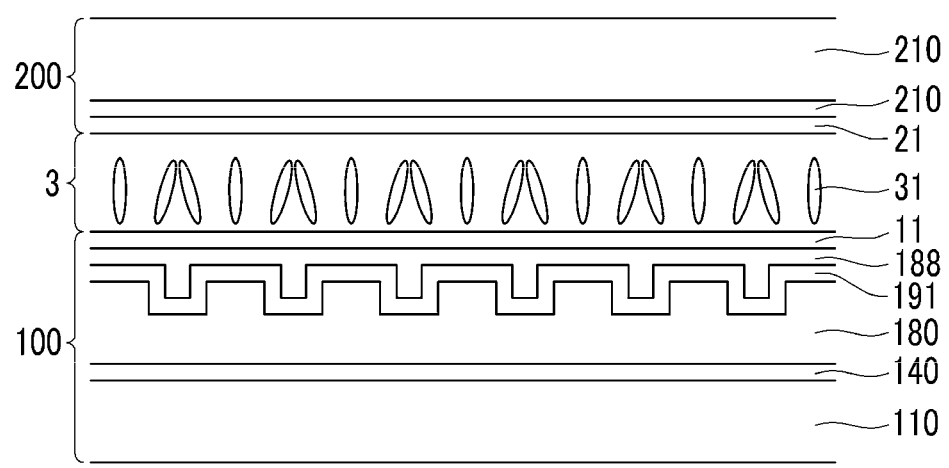
FIG. 7, FIG. 8, FIG. 9, FIG. 10, FIG. 11, FIG. 12, and FIG. 13 are exemplary cross-sectional views of the liquid crystal display of FIG. 3 taken along line V-V.

First, referring to FIG. 7, the liquid crystal display according to the present exemplary embodiment is almost the same as the exemplary embodiment shown in FIG. 3, FIG. 4, and FIG. 5, but an insulating layer 188 is further formed between the pixel electrode 191 and the alignment layer 11. The insulating layer 188 is formed on the protrusions and depressions of the pixel electrode 191 and may be planarized on its upper surface. However, due to the planarization of the insulating layer 188, the liquid crystal molecules 31 may not be inclined toward the concave portion by the inclination of the edge of the convex portion of the pixel electrode 191. Additionally, when the liquid crystal molecules 31 of the liquid crystal layer 3 are pretilted, the liquid crystal molecules 31 may be inclined toward the concave portion near the edge of the convex portion, that is, the minute branches 194, as shown in FIG. 7.

Figure 8:
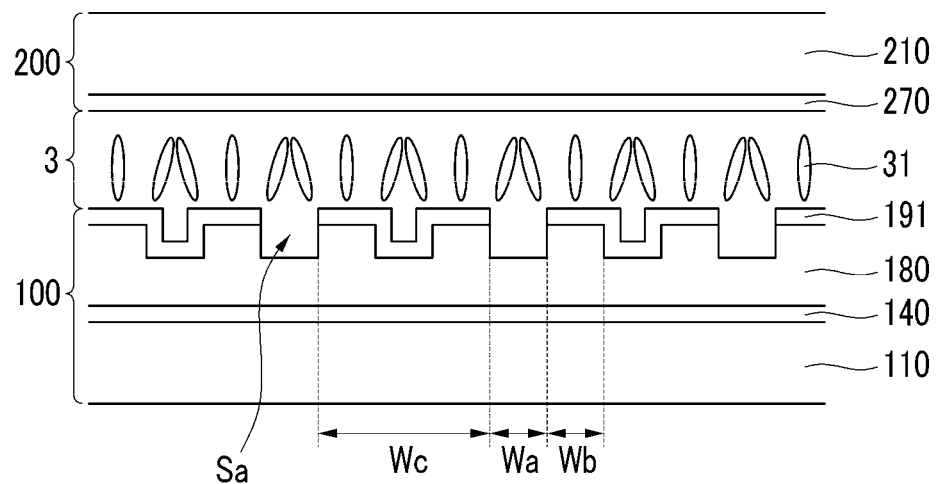

Referring to FIG. 8, the liquid crystal display according to the present exemplary embodiment is almost the same as the exemplary embodiment shown in FIG. 3, FIG. 4, and FIG. 5, but a structure of the protrusions and depressions of the pixel electrode 191 is different.

The structure of the protrusions and depressions of the passivation layer 180 and the inclination of the liquid crystal molecules of the liquid crystal layer 3 are the same as in the exemplary embodiment of FIG. 3, FIG. 4, and FIG. 5; however, a portion of the pixel electrode 191 is removed at portions such as at least a portion of the region between the minute branches 194. The removed portion forms a slit portion Sa in the pixel electrode 191. That is, concave portions of the pixel electrode 191 are alternately formed every two concave portions of the passivation layer 180. In other words, the region between the minute branches 194 neighboring one side of a minute branch 194 is removed, and the region between the minute branches 194 neighboring the other side of the minute branch 194 is conserved. Therefore, concave portions of the passivation layer 180 are exposed through the pixel electrode 191 between pairs of convex portions of the passivation layer 180.

As shown in FIG. 3, FIG. 4, and FIG. 5, the width Wb of the convex portion and the width Wa of the concave portion may be from 2 μm to 6 μm, and the width We of the portion including two convex portions connected by portions of the pixel electrode and the concave portion therebetween may be from 6 μm to 18 μm. Accordingly, the entire width of two convex portions neighboring one slit portion Sa and the one slit portion Sa (i.e., the concave portion therebetween) may be from 8 μm to 24 μm.

Figure 9:
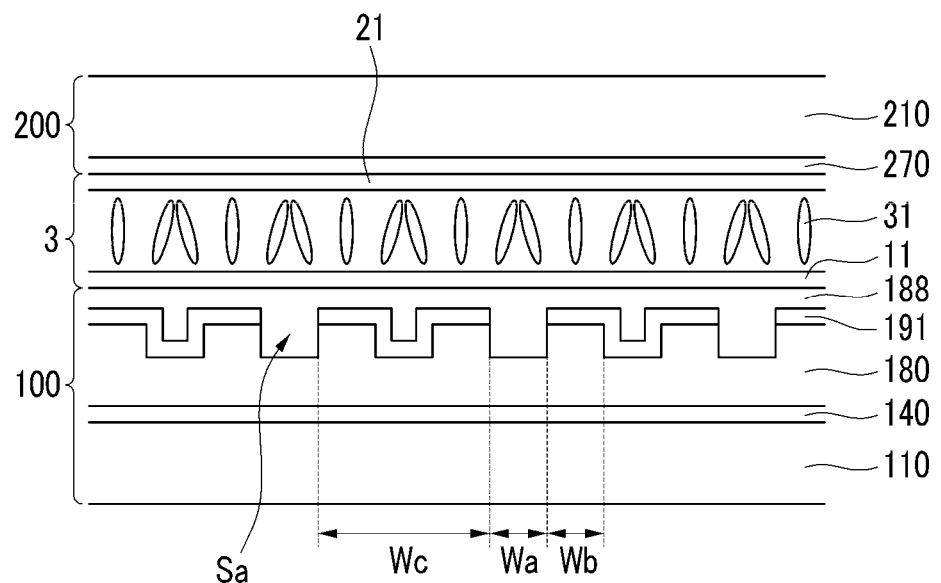

Next, referring to FIG. 9, the liquid crystal display according to the present exemplary embodiment is almost the same as the exemplary embodiment shown in FIG. 8, but an insulating layer 188 for planarization is further formed between the pixel electrode 191 and the alignment layer 11. The discussion of the characteristics and the effects of the insulating layer 188 from the exemplary embodiment of FIG. 7 may be applied to the present exemplary embodiment.

Figure 10:
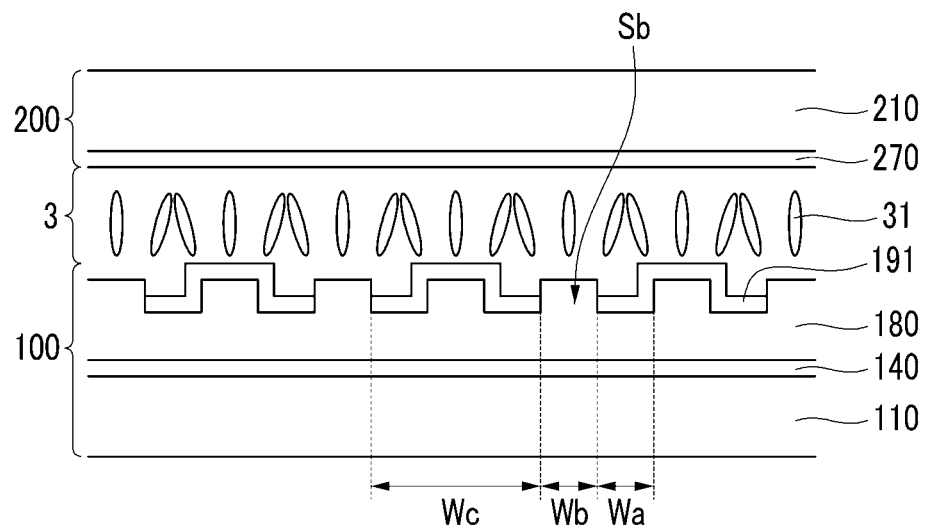

Next, referring to FIG. 10, in the liquid crystal display according to the present exemplary embodiment, the protrusions and depressions of the pixel electrode 191 are formed with a shape that is complementary to that of the exemplary embodiment shown in FIG. 8.

That is, a portion of the pixel electrode 191 is removed from at least a portion of the region between the minute branches 194, and the removed portion forms a slit portion Sb. In detail, convex portions of the pixel electrode 191 are alternately removed every two concave portions of the passivation layer 180. That is, the minute branch 194 neighboring one side of a minute branch 194 is removed, while the minute branch 194 neighboring the other side of the minute branch 194 remains.

As shown in FIG. 3, FIG. 4, and FIG. 5, the width Wb of the convex portion and the width Wa of the concave portion may be from 2 μm to 6 μm, and the width Wc of the portion including two concave portions connected to one convex portion therebetween may be from 6 μm to 18 μm. Accordingly, the width of one slit portion Sb, two concave portions neighboring the one slit portion Sb, and the convex portion therebetween may be from 8 μm to 24 μm.

Figure 11:
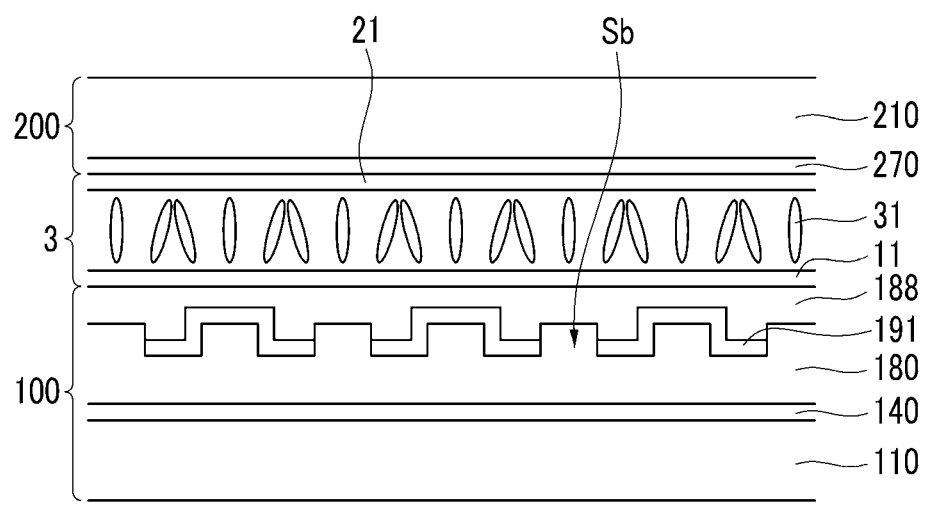

Next, referring to FIG. 11, the liquid crystal display according to the present exemplary embodiment is almost the same as the exemplary embodiment shown in FIG. 10, but an insulating layer 188 for planarization is further formed between the pixel electrode 191 and the alignment layer 11. The characteristics and the effects of the insulating layer 188 of the exemplary embodiment of FIG. 7 may be applied to the present exemplary embodiment.

Figure 12:
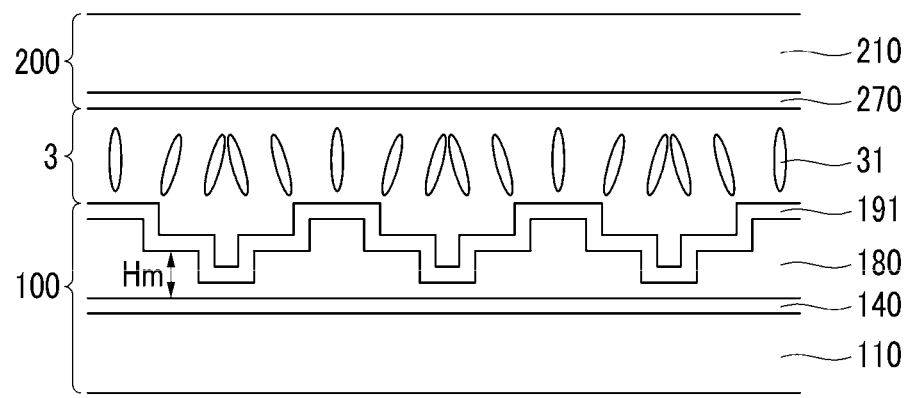

Next, referring to FIG. 12, the liquid crystal display according to the present exemplary embodiment is almost the same as the exemplary embodiment shown in FIG. 3, FIG. 4, and FIG. 5, but a structure of the protrusions and depressions of the pixel electrode 191 and the passivation layer 180 is different.

The minute branches 194 of the pixel electrode 191 are formed of protrusions and depressions (or formed to be concave or convex) and are alternately disposed. That is, the protrusions and depressions of the neighboring minute branches 194 have an opposite shape such that the minute branches 194 formed of the convex portion and the minute branches 194 formed of the concave portion are alternately disposed. Also, the regions between neighboring minute branches 194 are formed with a flat portion having a middle height Hm between the alternating convex portion and the concave portion.

Figure 13:
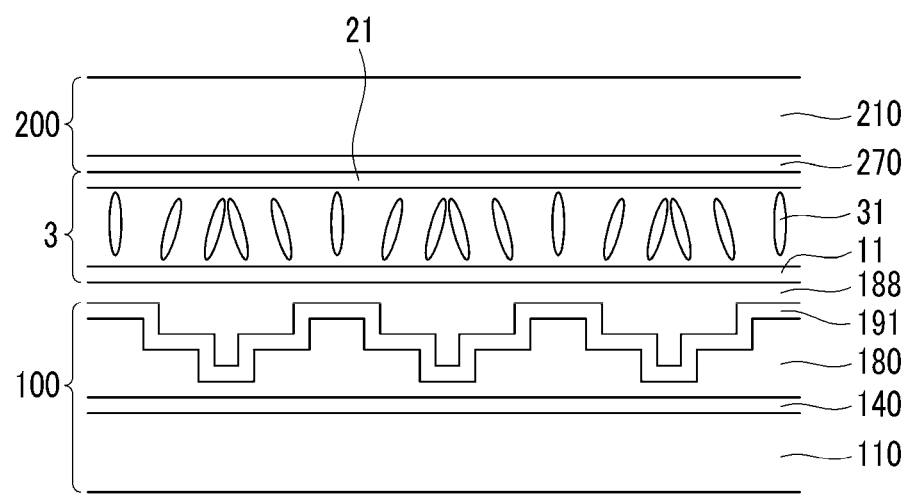

Next, referring to FIG. 13, the liquid crystal display according to the present exemplary embodiment is almost the same as the exemplary embodiment shown in FIG. 12, but an insulating layer 188 for planarization is further formed between the pixel electrode 191 and the alignment layer 11. The characteristics of the insulating layer 188 and the arrangement of the liquid crystal molecules 31 of the liquid crystal layer 3 of the exemplary embodiment shown in FIG. 7 may be applied to the present exemplary embodiment.

In the respective exemplary embodiments of FIG. 7, FIG. 8, FIG. 9, FIG. 10, FIG. 11, FIG. 12, and FIG. 13, the protrusions and depressions of the minute branches 194 of the pixel electrode 191 and the region between neighboring minute branches 194 may be exchanged with each other. Also, the protrusion and depression shape of the transverse stem 193 and the longitudinal stem 192 of the pixel electrode 191 may be the same as the minute branches 194 or the region between the minute branches 194.

The various characteristics and effects such as the width and the height of the protrusion and depression portions of the pixel electrode 191, operations, and the cell gap of the liquid crystal layer 3 of the exemplary embodiment shown in FIG. 3, FIG. 4, FIG. 5, and FIG. 6 may be applied to the exemplary embodiments shown in FIG. 7, FIG. 8, FIG. 9, FIG. 10, FIG. 11, FIG. 12, and FIG. 13.

Next, another exemplary embodiment of the liquid crystal display will be described with reference to FIG. 14A, FIG. 14B and FIG. 15 as well as FIG. 4, FIG. 5, FIG. 6, FIG. 7, FIG. 8, FIG. 9, FIG. 10, FIG. 11, FIG. 12, and FIG. 13. Again, like reference numerals designate like elements in the exemplary embodiments and previous descriptions are not repeated.

Figure 14A:
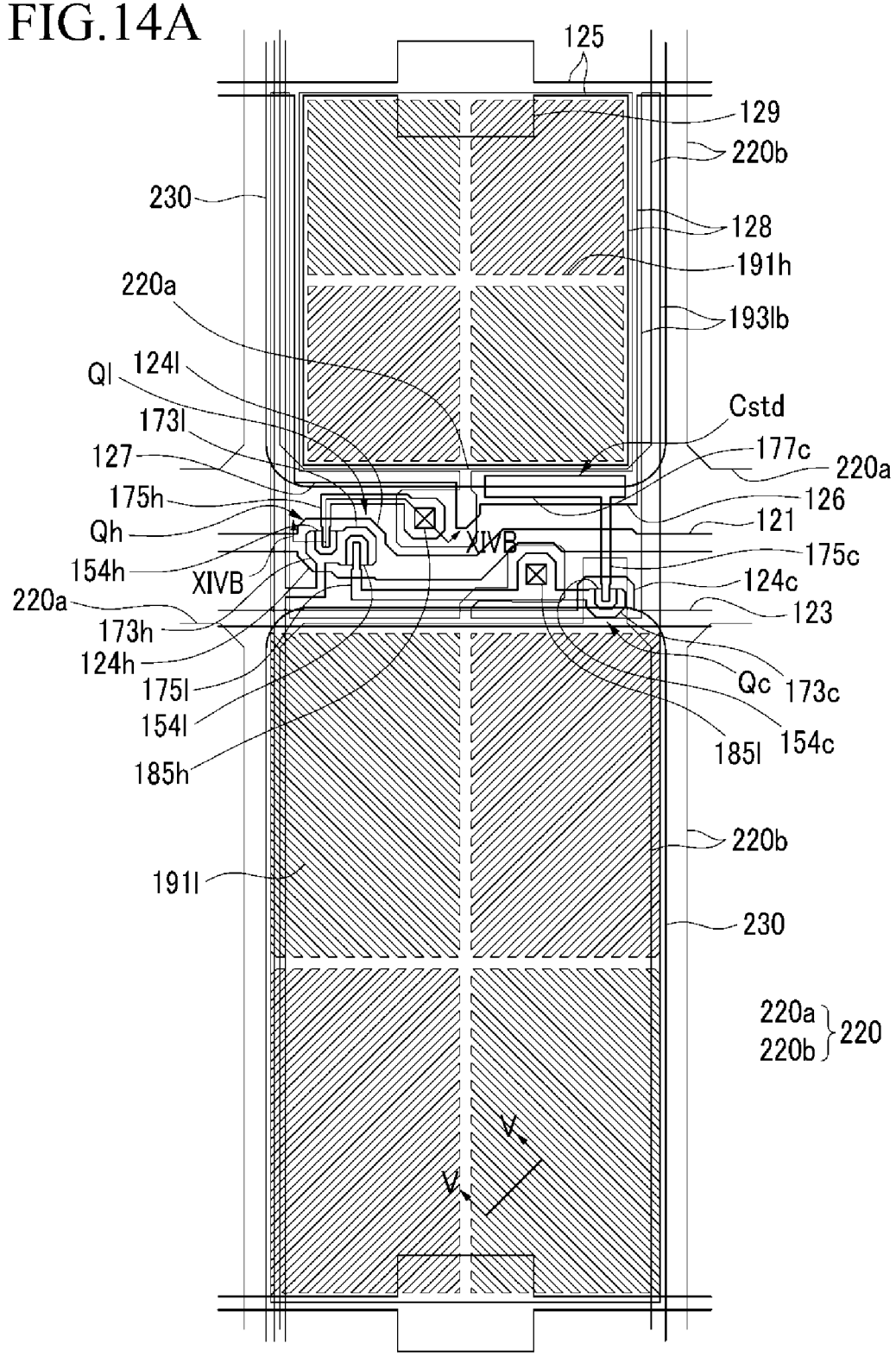
FIG. 14A is a layout view of one pixel of a liquid crystal display according to another exemplary embodiment of the present invention.
Figure 14B:
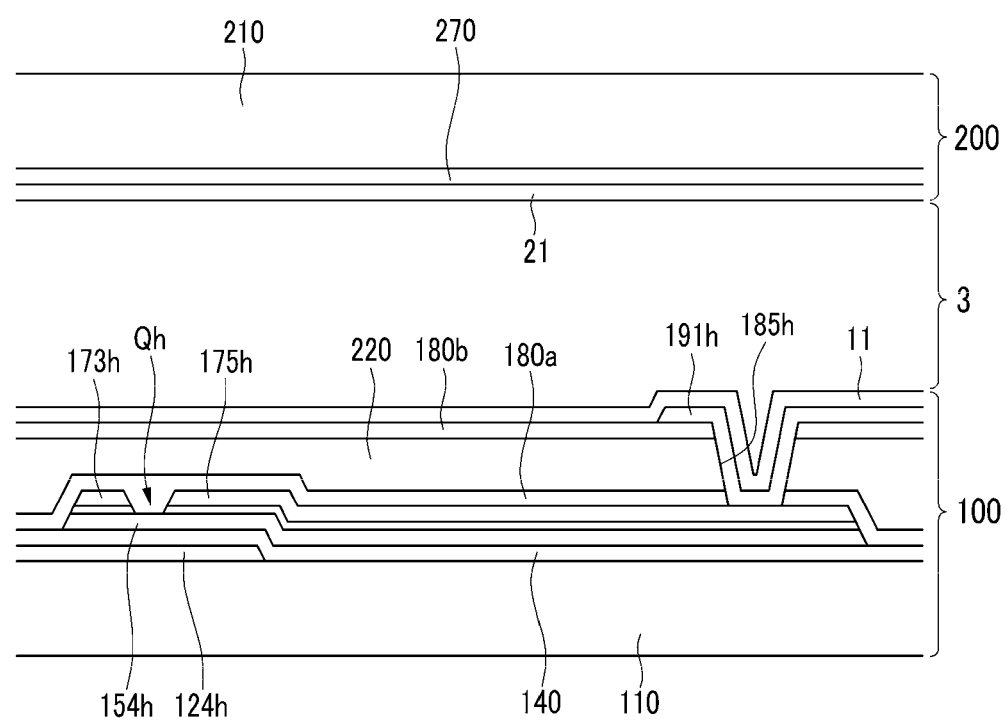
FIG. 14B is a cross-sectional view of the liquid crystal display of FIG. 14A taken along line XIVB-XIVB.
Figure 15:
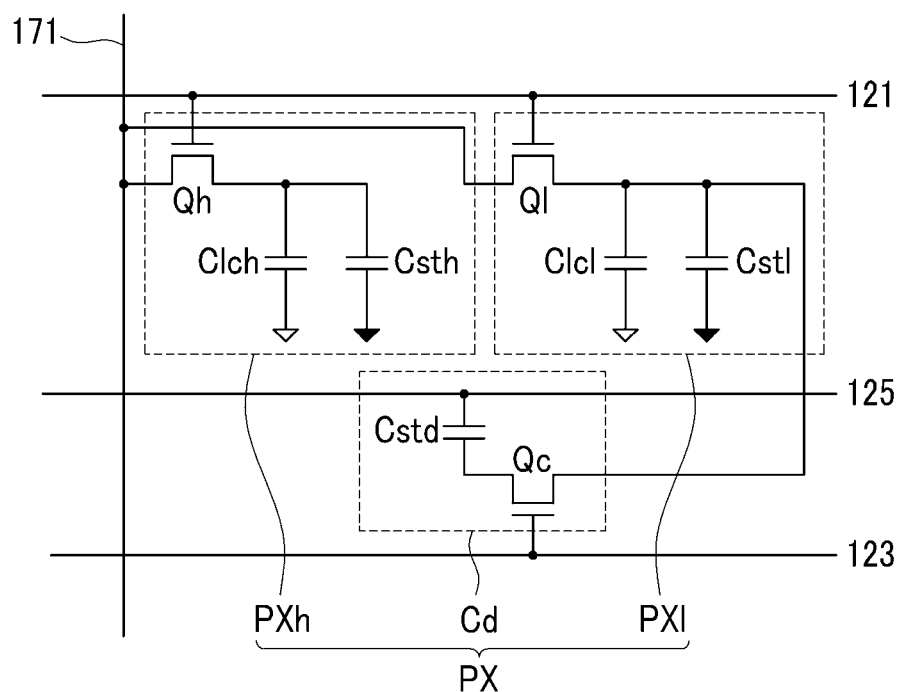
FIG. 15 is an equivalent circuit diagram of one pixel of the liquid crystal display shown in FIG. 14A.

FIG. 14A is a layout view of one pixel of a liquid crystal display according to another exemplary embodiment of the present invention, and FIG. 14B is a cross-sectional view of the liquid crystal display of FIG. 14A taken along line XIVB-XIVB, and FIG. 15 is an equivalent circuit diagram of the one pixel shown in FIG. 14A.

A liquid crystal display according to the present exemplary embodiment includes a lower panel 100 and an upper panel 200 facing each other and a liquid crystal layer 3 interposed between the two display panels 100 and 200.

First, referring to the upper panel 200, a common electrode 270 is formed on an insulation substrate 210, and an upper alignment layer 21 is formed on the common electrode 270. The upper alignment layer 21 may be a vertical alignment layer.

The liquid crystal layer 3 has negative dielectric anisotropy, and the liquid crystal molecules of the liquid crystal layer may be aligned so that long axes thereof are perpendicular with respect to the surface of the two display panels 100 and 200 in a state in which there is no electric field.

Next, the lower panel 100 will be described.

A plurality of gate conductors including a plurality of gate lines 121, a plurality of step-down gate lines 123, and a plurality of storage electrode lines 125 are formed on an insulation substrate.

The gate line 121 and the step-down gate line 123 mostly extend in a horizontal direction and transfer a gate signal. The gate line 121 includes a first gate electrode 124$h$ and a second gate electrode 124$l$ that protrude upward and downward, and the step-down gate line 123 includes a third gate electrode 124$c$ that protrudes upward. The first gate electrode 124$h$ and the second gate electrode 124$l$ are connected to each other to form one protrusion portion.

The storage electrode line 125 mostly extends in a horizontal direction and transfers a voltage such as a common voltage Vcom. The storage electrode line 125 includes a storage electrode 129 that protrudes upward and downward, a pair of vertical portions 128 that vertically extend downward with respect to the gate line 121, and a transverse portion 127 that connects the ends of a pair of longitudinal portions 128 to each other. The transverse portion 127 includes a capacitive electrode 126.

A gate insulating layer (not shown) is formed on the gate conductors 121, 123, and 125.

A plurality of semiconductor stripes that may be made of amorphous silicon, polysilicon, or the like is formed on the gate insulating layer. The semiconductor stripe mostly extends in a vertical direction and includes (a) first and second semiconductors 154$h$ and 154$l$ that extend toward the first and second gate electrodes 124$h$ and 124$l$ and connect to each other and (b) a third semiconductor 154$c$ that is connected to the second semiconductor 154$l$.

A plurality of pairs of ohmic contacts (not shown) is formed on the semiconductor stripes.

A data conductor that includes a plurality of data lines 171, a plurality of first drain electrodes 175$h$, a plurality of second drain electrodes 175$l$, and a plurality of third drain electrodes 175$c$ is formed on the ohmic contacts.

The data line 171 transmits a data signal and mainly extends in a vertical direction and crosses the gate line 121 and the step-down gate line 123. Each data line 171 includes a first source electrode 173$h$ and a second source electrode 173$l$ that extend toward the first gate electrode 124$h$ and the second gate electrode 124$l$ and form a sideways-oriented S-shape.

The first drain electrode 175$h$, the second drain electrode 175$l$, and the third drain electrode 175$c$ include a wide end portion and a rod-shaped end portion. A portion of the rod-shaped end portion of the first drain electrode 175$h$ and the second drain electrode 175$l$ is partially surrounded by the first source electrode 173$h$ and the second source electrode 173$l$. The wide end portion of the second drain electrode 175$l$ extends to form a U-shaped third source electrode 173$c$. An expansion portion 177$c$ of the third drain electrode 175$c$ is overlapped with the capacitive electrode 126 to form the step-down capacitor Cstd, and the rod-shaped end is partially surrounded by the third source electrode 173$c$.

The first, second, and third gate electrodes 124$h$, 124$l$, and 124$c$, the first, second, and third source electrodes 173$h$, 173$l$, and 173$c$, and the first, second, and third drain electrodes 175$h$, 175$l$, and 175$c$ and the semiconductor islands 154$h$, 154$l$, and 154$c$ together form the first, second, and third thin film transistors Qh, Ql, and Qc, respectively. A channel of the thin film transistor is formed in each of the semiconductors 154$h$, 154$l$, and 154$c$ between each of the source electrodes 173$h$, 173$l$, and 173$c$ and each of the drain electrodes 175$h$, 175$l$, and 175$c$.

The semiconductor stripe that includes the semiconductors 154$h$, 154$l$, and 154$c$ has a flat surface shape that is substantially the same as the data conductors 171, 175$h$, 175$l$, and 175$c$ and the ohmic contacts therebeneath with the exception of the channel region between the source electrodes 173$h$, 173$l$, and 173$c$ and the drain electrodes 175$h$, 175$l$, and 175$c$.

A lower passivation layer 180$a$ that may be made of an inorganic insulator such as silicon nitride or silicon oxide is formed on the data conductors 171, 175$h$, 175$l$, and 175$c$ and the exposed portion of the semiconductors 154$h$, 154$l$, and 154$c$.

Color filters 230 may be disposed on the lower passivation layer 180$a$. The color filter 230 is disposed at most regions with the exception of regions in which the first thin film transistor Qh, the second thin film transistor Ql, and the third thin film transistor Qc are disposed. However, it may extend in a vertical direction along the space between the data lines 171 that are adjacent to each other. Moreover, the color filter 230 may be formed on the upper panel 200.

A light blocking member 220 is disposed on the region in which the color filter 230 is not disposed and a portion of the color filter 230. The light blocking member 220 extends upward and downward along the gate line 121 and the step-down gate line 123. The light blocking member 220 includes a first light blocking member 220$a$ that covers the region in which the first thin film transistor Qh, the second thin film transistor Ql, and the third thin film transistor Qc are disposed and a second light blocking member 220$b$ that extends along the data line 171.

An upper passivation layer 180$b$ may be formed on the color filter 230 and the light blocking member 220.

The lower passivation layer 180$a$, the light blocking member 220, and the upper passivation layer 180$b$ have a plurality of first contact holes 185$h$ and a plurality of second contact holes 185$l$ that expose the wide portion of the first drain electrode 175$h$ and the wide portion of the second drain electrode 175$l$.

The pixel electrode including a first sub-pixel electrode 191$h$ and a second sub-pixel electrode 191$l$ is formed on the upper passivation layer 180$b$. The first sub-pixel electrode 191$h$ and the second sub-pixel electrode 191$l$ are separated from each other with the gate line 121 and the step-down gate line 123 therebetween and are disposed above and beneath the pixel area to be adjacent in a column direction. The second sub-pixel electrode 191$l$ is higher than the first sub-pixel electrode 191$h$ and may be about one to three times the size of the first sub-pixel electrode 191$h$.

The first and second sub-pixel electrodes 191$h$ and 191$l$ have almost the same shape as the pixel electrode 191 of the exemplary embodiment shown in FIG. 3. However, in the present exemplary embodiment, the first sub-pixel electrode 191$h$ further includes an outer stem enclosing the outer portion, and the second sub-pixel electrode 191$l$ further includes a transverse portion disposed on the upper and lower portions and right and left longitudinal portions 1931$b$ disposed on the right and left sides of the first sub-pixel electrode 191$h$. The right and left portions 1931$b$ may prevent capacitive coupling between the data line 171 and the first sub-pixel electrode 191$h$.

Like the above-described exemplary embodiment of FIG. 3, the transverse stem, the longitudinal stem, and the minute branches extended therefrom of the first and second sub-pixel electrodes 191$h$ and 191$l$ are referred to as the liquid crystal direction controllers.

The first sub-pixel electrode 191$h$ and the second sub-pixel electrode 191$l$ receive a data voltage through the first contact hole 185$h$ and the second contact hole 185$l$ from the first drain electrode 175$h$ and the second drain electrode 175$l$, respectively. The first sub-pixel electrode 191$h$ and the second sub-pixel electrode 191$l$ to which the data voltage is applied generate an electric field in conjunction with the common electrode 270 of the common electrode panel 200 to determine a direction of the liquid crystal molecule of the liquid crystal layer 3 between the two electrodes 191 and 270. In the state in which the electric field does not exist, the liquid crystal molecules of the liquid crystal layer that are aligned perpendicularly to the surface of the two electrodes are slanted toward the direction parallel to the surface of the two electrodes, and the luminance of the light passing through the liquid crystal layer is changed according to the degree of tilting and orientation of the liquid crystal molecules.

The cross-sectional shape of the minute branches of the present exemplary embodiment, that is, the liquid crystal direction controller, and the operation of the liquid crystal molecules of the liquid crystal layer are the same as that of the above described exemplary embodiments so descriptions thereof are omitted. For example, the cross-sectional view of the liquid crystal display taken along line V-V of FIG. 14A may be the same as the cross-sectional view of FIG. 5, FIG. 6, FIG. 7, FIG. 8, FIG. 9, FIG. 10, FIG. 11, FIG. 12, and FIG. 13. However, the color filter 230 disposed in the upper panel 200 in FIG. 5 may be positioned in the lower panel 100.

The first sub-pixel electrode 191$h$ and the common electrode 270 form the first liquid crystal capacitor Clch along with the liquid crystal layer 3 interposed therebetween, and the second sub-pixel electrode 191$l$ and the common electrode 270 form the second liquid crystal capacitor Clcl along with the liquid crystal layer 3 interposed therebetween, thereby maintaining the voltage after the first and second thin film transistors Qh and Ql are turned off.

The first and second sub-pixel electrodes 191$h$ and 191$l$ overlap the storage electrode 129 and the storage electrode line 125 to form the first and second storage capacitors Csth and Cstl, and the first and second storage capacitors Csth and Cstl aid the first and second liquid crystal capacitors Clch and Clcl to maintain the applied voltage.

The capacitive electrode 126 and the expansion portion 177c of the third drain electrode 175c overlap with the gate insulating layer 140 and the semiconductor layer therebetween to form a step-down capacitor Cstd. However, the semiconductor layer disposed between the capacitive electrode 126 and the expansion portion 177c of the third drain electrode 175c may be removed.

A lower alignment layer 11 is formed on the pixel electrode 191, and the lower alignment layer 11 may be a vertical alignment layer.

Next, a circuit structure and an operation of the liquid crystal display shown in FIG. 14A and FIG. 14B are described with reference to FIG. 15.

The liquid crystal display according to an exemplary embodiment of the present invention includes a signal line that includes a gate line 121, a storage electrode line 125, a step-down gate line 123, and a data line 171, and a pixel PX that is connected thereto.

The pixel PX includes a first sub-pixel PXh, a second sub-pixel PXl, and a step-down unit Cd.

The first sub-pixel PXh includes a first switching element Qh, a first liquid crystal capacitor Clch, and a first storage capacitor Csth, and the second sub-pixel PXl includes a second switching element Ql, a second liquid crystal capacitor Clcl, and a second storage capacitor Cstl. The step-down unit Cd includes a third switching element Qc and a step-down capacitor Cstd.

The first and second switching elements Qh and Ql are three-terminal elements such as thin film transistors that are provided in the lower display panel 100. The control terminals of the first and second switching elements Qh and Ql are connected to the gate line 121, and the input terminals are connected to the data line 171. The output terminals are connected to the first and second liquid crystal capacitors Clch and Clcl and the first and second storage capacitors Csth and Cstl.

The third switching element Qc is a three-terminal element such as a thin film transistor that is provided in the lower display panel 100. The control terminal thereof is connected to the step-down gate line 123, and the input terminal is connected to the second liquid crystal capacitor Clcl. The output terminal is connected to the step-down capacitor Cstd.

The first and second liquid crystal capacitors Clch and Clcl are formed by overlapping the (a) first and second sub-pixel electrodes 191h and 191l that are connected to the first and second switching elements Qh and Ql, respectively, with (b) the common electrode 270 of the upper display panel 200. The first and second storage capacitors Csth and Cstl are formed by overlapping the storage electrode 129 and the storage electrode line 125 with the first and second sub-pixel electrodes 191h and 191l.

The step-down capacitor Cstd is connected to the output terminal of the third switching element Qc and the storage electrode line 125 and is formed by overlapping the storage electrode line 125 that is provided in the lower display panel 100 with the output terminal of the third switching element Qc with an insulator therebetween.

An operation of the liquid crystal display of FIG. 14A, FIG. 14B, and FIG. 15 will now be described.

First, if the gate line 121 is applied with the gate-on voltage Von, the first and second thin film transistors Qh and Ql are turned on.

Accordingly, the data voltage applied to the data line 171 is equally applied to the first and second subpixel electrodes 191h and 191l through the turned-on first and second switching elements Qh and Ql. The first and second liquid crystal capacitors Clch and Clcl are charged by a difference between the common voltage Vcom of the common electrode 270 and the voltage of the first and second subpixel electrodes 191h and 191l such that the charging voltage of the first liquid crystal capacitor Clch is the same as the charging voltage of the second liquid crystal capacitor Clcl. Here, the step-down gate line 123 is applied with the gate-off voltage Voff.

Next, if the gate line 121 is applied with the gate-off voltage Voff and simultaneously the step-down gate line 123 is applied with the gate-on voltage Von, the first and second switching elements Qh and Ql connected to the gate line 121 are turned off, and the third switching element Qc is turned on. Accordingly, the charges of the second subpixel electrode 191l connected to the output terminal of the second switching element Ql flows in the step-down capacitor Cstd such that the voltage of the second liquid crystal capacitor Clcl is decreased.

In the case in which the liquid crystal display according to the present exemplary embodiment is driven by frame inversion, the data line 171 may have a positive data voltage with respect to the common voltage Vcom in the present frame, and negative charges are gathered in the step-down capacitor Cstd after the previous frame is finished. In the present frame, if the third switching element Qc is turned on, the positive charges of the second subpixel electrode 191l flow in the step-down capacitor Cstd through the third switching element Qc such that positive charges are gathered in the step-down capacitor Cstd, and the voltage of the second liquid crystal capacitor Clcl is decreased. In the next frame, the third switching element Qc is turned on in the state in which the negative charges are charged in the second subpixel electrode 191l such that the negative charges of the second subpixel electrode 191l flow in the step-down capacitor Cstd with the negative charges gathered in the step-down capacitor Cstd, and the voltage of the second liquid crystal capacitor Clcl is decreased.

As described above, according to the present exemplary embodiment, the charging voltage of the second liquid crystal capacitor Clcl is always lower than the charging voltage of the first liquid crystal capacitor Clch regardless of the polarity of the data voltage. Accordingly, the charging voltages of the first and second liquid crystal capacitors Clch and Clcl are different such that the lateral view of the liquid crystal display may be improved.

Different from the present exemplary embodiment, the first and second switching elements Qh and Ql of the first and second subpixel electrodes 191h and 191l may be applied with different data voltages obtained from one image information signal through different data lines or at different times. Also, the first sub-pixel electrode 191h may only be applied with the data voltage through the switching element, and the second sub-pixel electrode 191l may be capacitively connected to the first sub-pixel electrode 191h, thereby receiving the relatively low voltage. In the case of the several exemplary embodiments, the third switching element Qc and the step-down capacitor Cstd may be omitted.

Next, another exemplary embodiment of the liquid crystal display shown in FIG. 1 and FIG. 2 are described with reference to FIG. 16, FIG. 17, FIG. 18, FIG. 19, and FIG. 20. Like reference numerals designate like elements in the exemplary embodiment and previous descriptions are not repeated below.

Figure 16:
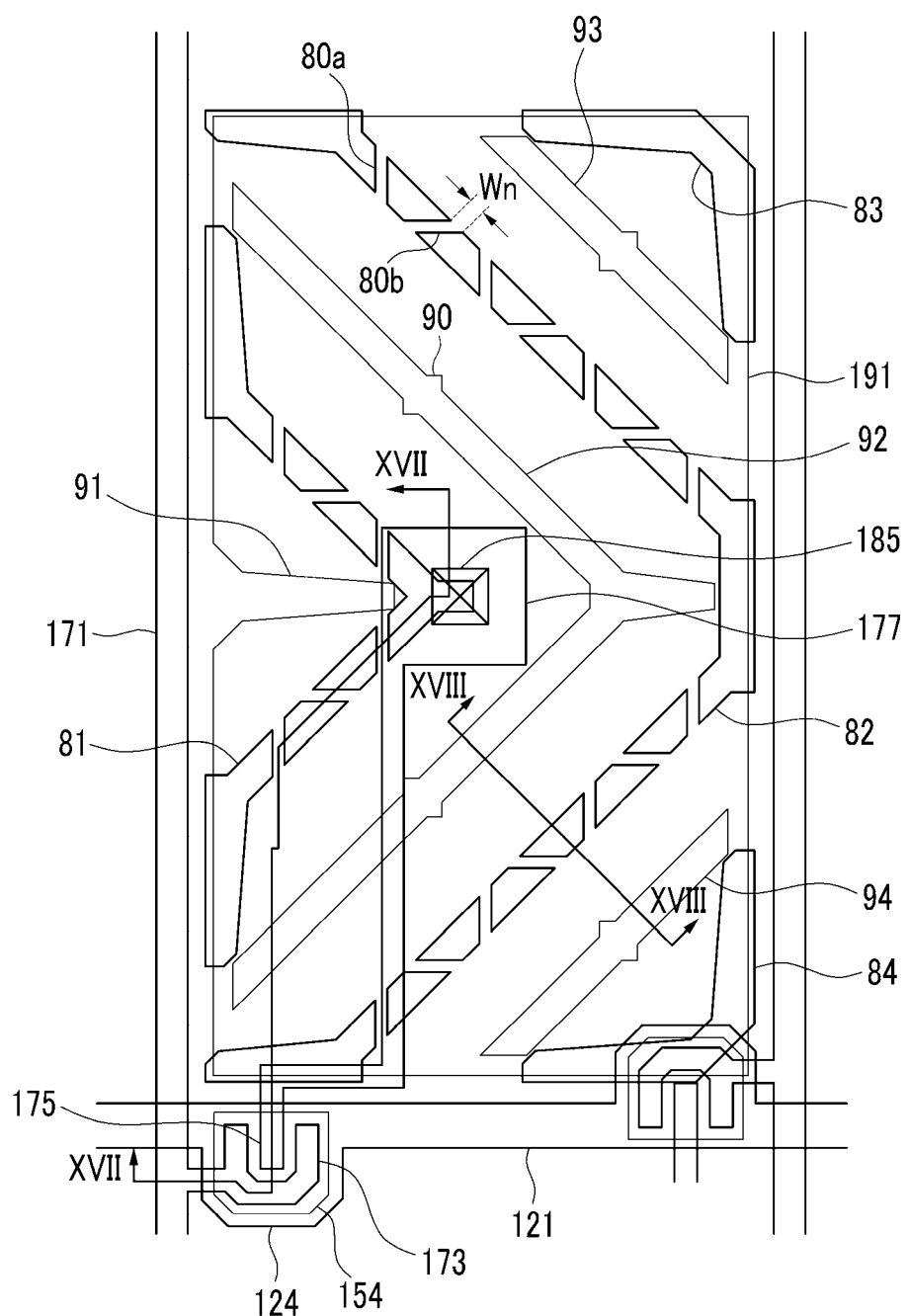
FIG. 16 is a layout view of one pixel of a liquid crystal display according to another exemplary embodiment of the present invention.
Figure 17:
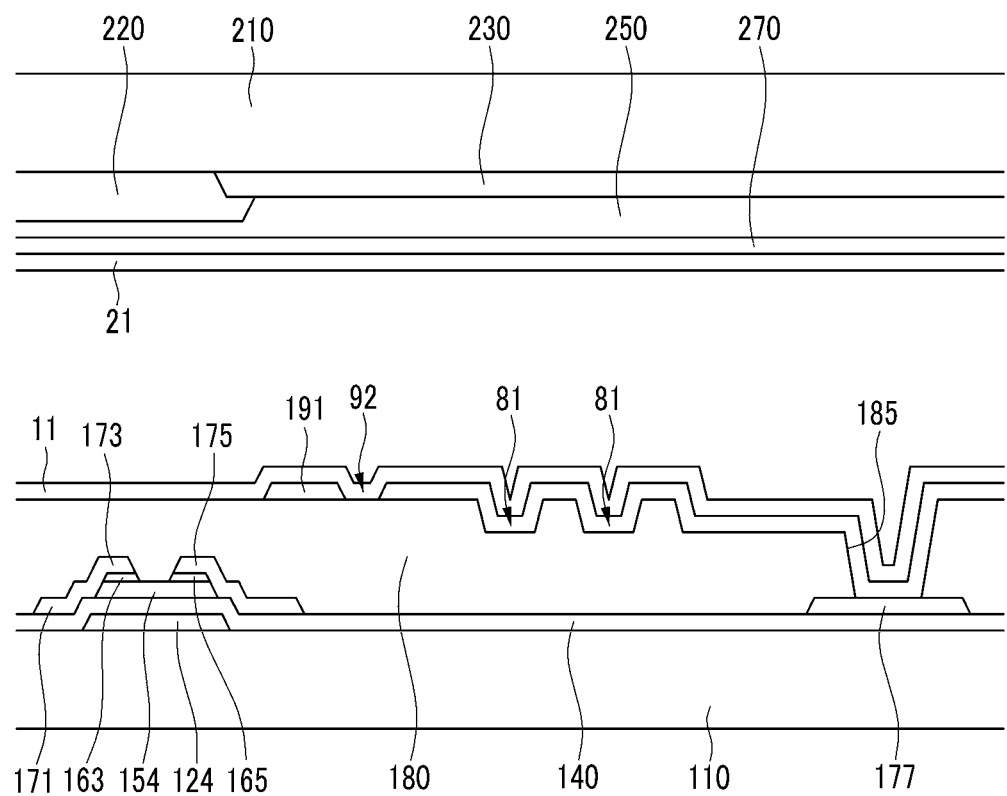
FIG. 17 is a cross-sectional view of the liquid crystal display of FIG. 16 taken along line XVII-XVII.

FIG. 16 is a layout view of one pixel of a liquid crystal display according to another exemplary embodiment of the present invention, and FIG. 17 is a cross-sectional view of the liquid crystal display of FIG. 16 taken along line XVII-XVII.

Figure 18:
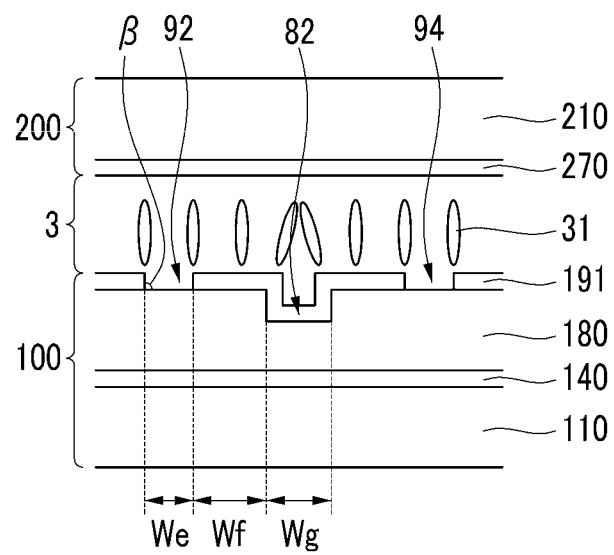
FIG. 18 is a cross-sectional view of the liquid crystal display of FIG. 16 taken along line XVIII-XVIII.
Figure 19:
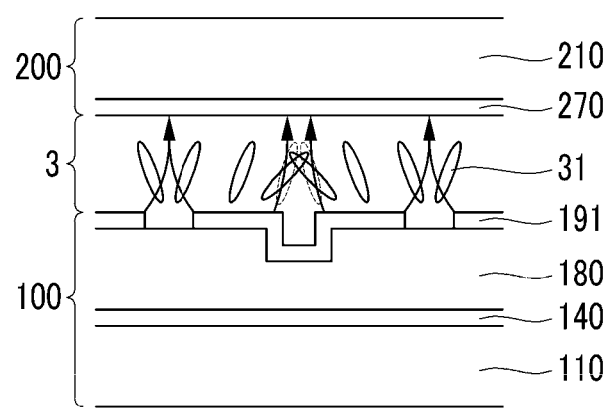
FIG. 19 is a cross-sectional view of the liquid crystal display of FIG. 16 taken along line XVIII-XVIII showing an arrangement change of liquid crystal molecules with application of an electric field to the liquid crystal layer.
Figure 20:
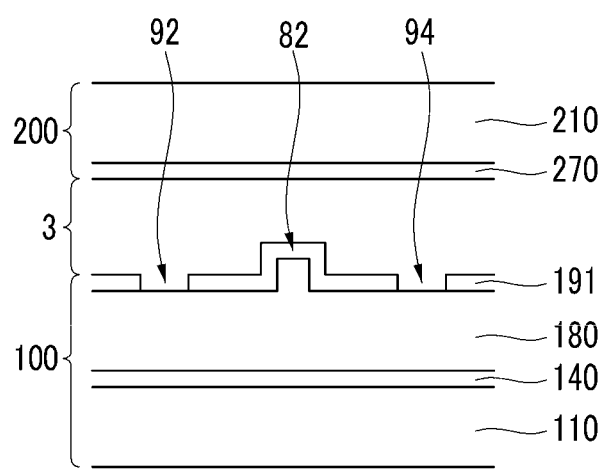
FIG. 20 is an exemplary cross-sectional view of the liquid crystal display of FIG. 16 taken along line XVIII-XVIII.

FIG. 18 is a cross-sectional view of the liquid crystal display of FIG. 16 taken along line XVIII-XVIII, and FIG. 19 is a cross-sectional view of the liquid crystal display of FIG. 16 taken along line XVIII-XVIII showing an arrangement change of liquid crystal molecules with application of an electric field to the liquid crystal layer. FIG. 20 is an exemplary cross-sectional view of the liquid crystal display of FIG. 16 taken along line XVIII-XVIII.

The liquid crystal display according to an exemplary embodiment of the present invention also includes lower and upper display panels 100 and 200 that face each other and a liquid crystal layer 3 interposed therebetween.

First, referring to the lower panel 100, a plurality of gate lines 121 including gate electrodes 124 are formed on an insulation substrate 110, and a gate insulating layer 140 is formed thereon. A plurality of semiconductor islands 154 are formed on the gate insulating layer 140, and a plurality of pairs of ohmic contact islands 163 and 165 are formed thereon. A plurality of data lines 171 including source electrodes 173 and a plurality of drain electrodes 175 are formed on the ohmic contacts 163 and 165 and the gate insulating layer 140. The drain electrode 175 includes a bar end portion enclosed by the source electrode 173 and an expansion 177 having a wide area for connection with other layers. A passivation layer 180 having a plurality of contact holes 185 exposing the expansions 177 of the drain electrode 175 is formed on the data line 171, the drain electrode 175, the source electrode 173, and the exposed semiconductor 154.

The gate electrode 124, the source electrode 173, the drain electrode 175, and the semiconductor 154 form the thin film transistor Q.

Meanwhile, different from the previous exemplary embodiment, a plurality of concave portions may be formed on the upper surface of the passivation layer 180.

A plurality of pixel electrodes 191 are formed on the passivation layer 180. The overall shape of the pixel electrode 191 is a quadrangle and includes a plurality of cutouts 91, 92, 93, and 94 and a plurality of liquid crystal direction controllers 81, 82, 83, and 84. The cutouts 91, 92, 93, and 94 and the liquid crystal direction controllers 81, 82, 83, and 84 are substantially symmetrical with respect to a virtual transverse center line (not shown) substantially bisecting the pixel electrode 191.

The cutouts 91, 92, 93, and 94 are one kind of the liquid crystal direction controller. The cutout 91 is formed at the center portion of the left edge of the pixel electrode 191. The cutout 92 has a transverse portion and a pair of oblique portions. The pair of oblique portions forms an angle of about 45° with respect to the gate line 121 and are perpendicular to each other.

The cutout 93 and the cutout 94 are disposed on the upper and lower portions of the pixel electrode 191 with respect to the transverse center line and are parallel to the oblique portions of the cutout 92.

The edge forming the cutouts 92, 93, and 94 may include notches 90 having a triangular shape. Different from FIG. 16, the notches 90 may be formed to be concave, may have different shapes from the triangular shape, and may have a shape cutting the cutouts 92 and 93.

Referring to FIG. 18, the width We of the cutouts 91, 92, 93, and 94 may be from 6 μm to 14 μm. The liquid crystal direction controller 81 is disposed between the cutout 91 and the cutout 92 of the pixel electrode 191 and includes a pair of oblique portions that extend substantially parallel to the cutouts 91 and 92 and a pair of longitudinal portions. A longitudinal portion extends along the edge of the pixel electrode 191 starting from the oblique portion and forms an obtuse angle with the oblique portion.

The liquid crystal direction controller 82 is disposed between the cutout 92 and the cutouts 93 and 94 of the pixel electrode 191 and includes a pair of oblique portions that extend substantially parallel to the oblique portion of the cutout 92 and the cutouts 93 and 94, a longitudinal portion connecting the pair of oblique portions, and a pair of transverse portions. The transverse portions extend along the upper and lower transverse edges of the pixel electrode 191 starting from the respective ends of the oblique portions and forms an obtuse angle along with the oblique portion.

The liquid crystal direction controller 83 and the liquid crystal direction controller 84 are respectively disposed on the upper side and on the lower side with respect to the virtual transverse center line of the pixel electrode 191 and respectively include a longitudinal portion and a transverse portion respectively extending along the transverse edges and the longitudinal edge of the pixel electrode 191.

Each of the oblique portions of the liquid crystal direction controllers 81 and 82 according to the present exemplary embodiment is divided into a plurality of small portions by a plurality of gaps 80a and 80b. The gap 80a and the gap 80b cut across the oblique portion of the liquid crystal direction controllers 81 and 82 thereby dividing them into several portions. The gap 80a and the gap 80b are alternately disposed with a uniform interval along the oblique portion, and the extended directions or the length directions of the two gaps 80a and 80b may be different from each other. For example, the extending direction of the gap 80a may be substantially perpendicular to the extending direction of the gate line 121, and the extending direction of the gap 80b may be substantially parallel to the extending direction of the gate line 121. However, the extending directions are not limited thereto, and the oblique portions of the liquid crystal direction controllers 81 and 82 may be divided by at least two gaps extending in at least two different directions.

The number of the gaps 80a and 80b of the liquid crystal direction controllers 81 and 82 may be more than the number of notches 90 formed in the cutouts 92, 93, and 94.

Also, the oblique portions of the liquid crystal direction controllers 81 and 82 may include notches such as the notches 90 of the cutouts 92 and 93 instead of including the plurality of gaps 80a and 80b. That is, the liquid crystal direction controllers 81 and 82 may not be divided by the gaps 80a and 80b but may include notches 90 that may have a triangular shape formed in a concave shape or a convex shape.

Referring to FIG. 16 and FIG. 18, the liquid crystal direction controllers 81, 82, 83, and 84 of the pixel electrode 191 may be concave along the concave portion of the passivation layer 180. In the cross-sectional structure of the liquid crystal direction controllers 81, 82, 83, and 84, the angle β formed by the side surface with the surface of the substrate 110 may be from 10° to 100°. Also, the width Wg of the liquid crystal direction controllers 81, 82, 83, and 84 may be from 2 μm to 6 μm, and the distance Wf between the cutouts 91, 92, 93, and 94 and the liquid crystal direction controllers 81, 82, 83, and 84 may be from 17 μm to 27 μm. As shown in FIG. 16, the width of the gaps 80a and 80b included in the liquid crystal direction controllers 81 and 82 may be from 2 μm to 6 μm.

On the other hand, the depth of the liquid crystal direction controllers 81, 82, 83, and 84 of the pixel electrode 191 may be from 0.1 μm to 0.6 μm.

The pixel electrode 191 is divided into a plurality of sub-regions by the cutouts 91, 92, 93, and 94 and the liquid crystal direction controllers 81, 82, 83, and 84. Here, the number of sub-regions may vary depending on design factors such as a size of the pixel electrode 191, the length ratio of the horizontal side to the vertical side of the pixel electrode 191, the type of characteristics of the liquid crystal layer 3, the inclination direction of the cutouts 91, 92, 93, and 94 and the liquid crystal direction controllers 81, 82, 83, and 84, which may be changed.

Further, an alignment layer 11 may be formed on the pixel electrode 191.

Next, referring to the upper panel 200, a light blocking member and a color filter may be formed on the insulation substrate 210, and an overcoat may be formed thereon. The opposing electrode 270 facing the pixel electrode 191 is formed on the whole surface of the insulating substrate 210 on the overcoat, and an alignment layer may be coated thereon.

The liquid crystal layer 3 between the lower panel 100 and the upper panel 200 may include liquid crystal molecules 31 having a negative dielectric anisotropy. The liquid crystal molecules 31 may be oriented such that their major axes are almost perpendicular to the surfaces of the two display panels 100 and 200 when no electric field is applied. However, the liquid crystal molecules 31 positioned near the liquid crystal direction controllers 81, 82, 83, and 84 of the pixel electrode 191 may be inclined toward the inside of the liquid crystal direction controllers 81, 82, 83, and 84 according to the inclination of the edge of the concave liquid crystal direction controllers 81, 82, 83, and 84.

Also, the liquid crystal molecules 31 may be initially aligned with a pretilt in the direction substantially perpendicular to the extending directions of the cutouts 91, 92, 93, and 94 and the liquid crystal direction controllers 81, 82, 83, and 84 of the pixel electrode 191. In this case, the liquid crystal layer 3 may further include a polymer determining the pretilt of the liquid crystal molecules 31 as well as the liquid crystal molecules 31. For the pretilt of the liquid crystal molecule 31, the method of forming the pretilt of the liquid crystal molecules 31 of the above-described exemplary embodiment of FIG. 3, FIG. 4, FIG. 5, and FIG. 6 may be used.

Next, the operation of the liquid crystal display according to the exemplary embodiment shown in FIG. 16, FIG. 17, and FIG. 18 is described with reference to FIG. 19 as well as FIG. 16, FIG. 17, and FIG. 18.

The pixel electrode 191 and the opposing electrode 270 applied with the data voltage and a predetermined voltage, respectively, generate the electric field perpendicular to the surface of the display panels 100 and 200 to the liquid crystal layer 3. The cutouts 91, 92, 93, and 94 of the pixel electrode 191 and the liquid crystal direction controllers 81, 82, 83, and 84 distort the electric field, thereby establishing a horizontal component of the electric field (with respect to the display panels 100 and 200) and determines the inclination direction of the liquid crystal molecules 31. The horizontal components of the electric field are approximately perpendicular to the extending direction of the cutouts 91, 92, 93, and 94 and the liquid crystal direction controllers 81, 82, 83, and 84. The long axes of the liquid crystal molecules 31 tend to orient perpendicular to the direction of the electric field such that the inclination directions of the liquid crystal molecules 31 are in four directions. Accordingly, four domains having liquid crystal molecules 31 of which the inclination directions are uniform are formed in the exemplary embodiment shown in FIG. 16. The liquid crystal molecules 31 near the liquid crystal direction controllers 81, 82, 83, and 84 are inclined in the direction of the pretilt due to the pretilt near the liquid crystal direction controllers 81, 82, 83, and 84, i.e., the liquid crystal molecules 31 are oriented toward the convex portion of the liquid crystal direction controllers 81, 82, 83, and 84. The liquid crystal molecules 31 near the cutouts 91, 92, 93, and 94 are inclined outwardly with reference to neighboring cutouts 91, 92, 93, and 94 by the distorted components of the electric field created by the cutouts 91, 92, 93, and 94, i.e., the liquid crystal molecules 31 are oriented away from the cutouts 91, 92, 93, and 94.

Particularly, the gaps 80*a* and 80*b* formed in the liquid crystal direction controllers 81, 82, 83, and 84 may control unstable texture that may be generated by a weak fringe field near the liquid crystal direction controllers 81, 82, 83, and 84 such that the transmittance may be further increased.

The pixel electrode 191 and the opposing electrode 270 forming the liquid crystal capacitor Clc maintain the applied voltage after the switching element Q is turned off.

As the unit of the horizontal period 1H, the gate signal is sequentially applied to all the gate lines 121, and the data voltage is applied to all the pixel electrodes 191 to display one frame of an image.

Although not shown in the exemplary embodiment of FIG. 18 and FIG. 19 but shown FIG. 17, the color filter 230, the overcoat 250, and the alignment layers 11 and 21 may be further included.

As described above, according to the present exemplary embodiment, the cutouts 91, 92, 93, and 94 and the liquid crystal direction controllers 81, 82, 83, and 84 that are alternately disposed on the pixel electrode 191 may vary the inclination directions of the liquid crystal molecules 31 of the liquid crystal layer 3 such that the reference viewing angle of the liquid crystal display may be increased. Also, the vertical component of the electric field near the liquid crystal direction controllers 81, 82, 83, and 84 may be enhanced such that the response speed of the liquid crystal molecule 31 may be improved, and the transmittance of the liquid crystal display may be increased.

Referring to FIG. 20, the liquid crystal direction controllers 81, 82, 83, and 84 and the passivation layer 180 thereunder may not be concave but may be convex in the liquid crystal display of FIG. 16. In this case, the inclination directions of the liquid crystal molecules 31 at the liquid crystal direction controller 81, 82, 83, and 84 may be opposite to the previous exemplary embodiment.

Also, in the exemplary embodiments shown in FIG. 16, FIG. 17, FIG. 18, FIG. 19, and FIG. 20, an insulating layer (not shown) for flatness and planarity may be further formed between the pixel electrode 191 and the alignment layer 11, and the characteristics and the effects of the insulating layer 188 of the exemplary embodiment of FIG. 7 may be applied to the insulating layer for the flatness of the present exemplary embodiment.

According to an exemplary embodiment of the present invention, the liquid crystal molecules of the liquid crystal layer are inclined according to the shape of the protrusions and depressions of the liquid crystal direction controller of the pixel electrode such that the response speed of the liquid crystal molecules may be improved and the transmittance of the liquid crystal display may be increased. Also, the inclined directions of the liquid crystal molecules of the liquid crystal layer are varied such that the viewing angle may be increased.

Also, by setting the width of the liquid crystal direction controllers of the pixel electrode including the protrusions and depressions or the height difference between the concave portion and the convex portion as in the exemplary embodiments as described above, the response speed of the liquid crystal molecules of the liquid crystal layer may be further improved and the transmittance may be improved.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A liquid crystal display, comprising:
a first substrate;
a switching element disposed on the first substrate;
a pixel electrode connected to the switching element;
an opposing electrode opposing the pixel electrode; and
a liquid crystal layer disposed between the pixel electrode and the opposing electrode and comprising liquid crystal molecules,
wherein the pixel electrode comprises a plurality of branches, length directions of the branches being different in different sub-regions of the pixel electrode,
wherein the pixel electrode comprises concave portions, convex portions, and slits where the pixel electrode is removed, the concave portions and the convex portions being alternately arranged,
wherein each of the slits is disposed between only neighboring convex portions or between only neighboring concave portions in a sub-region,
wherein the branches correspond to the concave portions or the convex portions, and
wherein two of the concave portions and one of the convex portions that is interposed between the two concave portions are adjacently arranged in the sub-region and extend in the same direction, or two of the convex portions and one of the concave portions that is interposed between the two convex portions are adjacently arranged in the sub-region and extend in the same direction.

2. The liquid crystal display of claim 1, wherein at least one of a width of the branches and a width of a region between the branches ranges from 2 µm to 6 µm, and a step difference between the branches and the region between the branches is less than 20% of a cell gap of the liquid crystal layer.

3. The liquid crystal display of claim 1, wherein a step difference between the branches and a region between the branches ranges from 0.1 µm to 0.6 µm.

4. The liquid crystal display of claim 1, wherein an angle formed by a side surface of the branches with a surface of the first substrate ranges from 10° to 100°.

5. The liquid crystal display of claim 1, further comprising a planarization layer disposed on the pixel electrode to planarize the pixel electrode.

6. The liquid crystal display of claim 1, wherein the opposing electrode comprises a single plate.

7. The liquid crystal display of claim 6, wherein a surface of the opposing electrode is substantially flat.

8. The liquid crystal display of claim 1, wherein the liquid crystal layer is in a vertical alignment mode with respect to a surface of the first substrate.

9. The liquid crystal display of claim 1, wherein the liquid crystal molecules are aligned with a pretilt in the length direction of the branches.

10. The liquid crystal display of claim 9, wherein the liquid crystal layer further comprises a polymer to provide the pretilt to the liquid crystal molecules.

11. The liquid crystal display of claim 9, further comprising:
an alignment layer disposed on at least one of the pixel electrode and the opposing electrode; and
a polymer to control the pretilt of the liquid crystal molecules between the liquid crystal molecules and the alignment layer.

12. The liquid crystal display of claim 1, wherein the pixel electrode further comprises a stem forming a boundary between the plurality of sub-regions, and the branches obliquely extend from the stem toward an outer boundary of the pixel electrode.

13. The liquid crystal display of claim 12, wherein the stem corresponds to the concave portions or the convex portions.

14. The liquid crystal display of claim 12, wherein the pixel electrode comprises a first sub-pixel electrode and a second sub-pixel electrode, the first sub-pixel electrode and the second sub-pixel electrode being configured to receive different voltages to control directions of the liquid crystal molecules.

15. A liquid crystal display, comprising:
a first substrate;
a switching element disposed on the first substrate;
a pixel electrode connected to the switching element;
an opposing electrode opposing the pixel electrode; and
a liquid crystal layer disposed between the pixel electrode and the opposing electrode and comprising liquid crystal molecules,
wherein the pixel electrode comprises a plurality of branches, length directions of the branches being different in different sub-regions of the pixel electrode,
wherein the pixel electrode comprises concave portions, convex portions, and slits where the pixel electrode is removed,
wherein the branches correspond to the concave portions or the convex portions,
wherein the slits are disposed between only neighboring convex portions or between only neighboring concave portions in a sub-region, and
wherein two of the concave portions and one of the convex portions that is interposed between the two concave portions are adjacently arranged in the sub-region and extend in the same direction, or two of the convex portions and one of the concave portions that is interposed between the two convex portions are adjacently arranged in the sub-region and extend in the same direction.

* * * * *